US012254464B2

(12) United States Patent
DeLuca et al.

(10) Patent No.: US 12,254,464 B2
(45) Date of Patent: Mar. 18, 2025

(54) CONTROLLING PUBLISHING OF ASSETS ON A BLOCKCHAIN

(71) Applicant: Unstoppable Domains, Inc., Las Vegas, NV (US)

(72) Inventors: Lisa Seacat DeLuca, Bozeman, MT (US); Braden River Pezeshki, Reno, NV (US)

(73) Assignee: Unstoppable Domains, Inc., Las Vegas, NV (US)

( * ) Notice: Subject to any disclaimer, the term of this patent is extended or adjusted under 35 U.S.C. 154(b) by 0 days.

(21) Appl. No.: 17/737,445

(22) Filed: May 5, 2022

(65) Prior Publication Data

US 2023/0360031 A1    Nov. 9, 2023

(51) Int. Cl.
G06Q 20/36      (2012.01)
G06F 21/31      (2013.01)
G06F 21/32      (2013.01)
G06Q 20/38      (2012.01)
G06Q 20/40      (2012.01)
H04L 9/00       (2022.01)

(52) U.S. Cl.
CPC ....... *G06Q 20/3674* (2013.01); *G06F 21/316* (2013.01); *G06F 21/32* (2013.01); *G06Q 20/3678* (2013.01); *G06Q 20/3821* (2013.01); *G06Q 20/401* (2013.01); *G06Q 20/4016* (2013.01); *H04L 9/50* (2022.05); *G06Q 2220/10* (2013.01); *H04L 2209/56* (2013.01)

(58) Field of Classification Search
CPC ............ G06Q 20/3823; G06Q 20/4014; G06F 16/90332; G06F 16/2365; G06F 21/10; H04L 63/105
See application file for complete search history.

(56) References Cited

U.S. PATENT DOCUMENTS 7,548,968 B1    6/2009  Bura et al.
7,664,831 B2    2/2010  Cartmell et al.
(Continued)

FOREIGN PATENT DOCUMENTS

CN      1984185 A       6/2007
WO      2020/010023 A1  1/2020
WO      2022/087420 A1  4/2022

OTHER PUBLICATIONS

International Search Report and Written Opinion in International Application No. PCT/US23/65610, dated Jul. 31, 2023, 9 pages.

(Continued)

*Primary Examiner* — Saba Dagnew
(74) *Attorney, Agent, or Firm* — Edell, Shapiro & Finnan, LLC

(57) ABSTRACT

According to a present invention embodiment, a system for controlling publishing of an asset on a blockchain comprises one or more memories and at least one processor coupled to the one or more memories. The system verifies a user requesting publishing of the asset on the blockchain. Verification information is generated that identifies the user and indicates successful verification of the user. The asset and the verification information are published on the blockchain. Embodiments of the present invention further include a method and computer program product for controlling publishing of an asset on a blockchain in substantially the same manner described above.

21 Claims, 12 Drawing Sheets

(56) References Cited

U.S. PATENT DOCUMENTS

| | | | |
|---|---|---|---|
| 7,698,425 | B2 | 4/2010 | Thayer et al. |
| 7,756,987 | B2 | 7/2010 | Wang et al. |
| 8,010,674 | B2 | 8/2011 | Fong |
| 8,239,677 | B2 | 8/2012 | Colson |
| 8,276,057 | B2 | 9/2012 | Rowe et al. |
| 8,285,830 | B1 | 10/2012 | Stout et al. |
| 8,312,364 | B2 | 11/2012 | Rowe et al. |
| 8,738,604 | B2 | 5/2014 | Devarajan et al. |
| 8,751,586 | B2 | 6/2014 | Adelman et al. |
| 8,886,747 | B1 | 11/2014 | Chen et al. |
| 8,904,040 | B2 | 12/2014 | Adelman et al. |
| 9,521,139 | B2 | 12/2016 | Lee et al. |
| 9,553,981 | B2 | 1/2017 | Czarnecki et al. |
| 9,779,125 | B2 | 10/2017 | Gupta |
| 9,785,663 | B2 | 10/2017 | Gupta |
| 10,178,069 | B2 | 1/2019 | Li et al. |
| 10,296,569 | B2 | 5/2019 | Akkarawittayapoom |
| 10,382,388 | B2 | 8/2019 | Li et al. |
| 10,432,584 | B1 | 10/2019 | Raman et al. |
| 10,505,980 | B2 | 12/2019 | Child et al. |
| 10,601,829 | B1 | 3/2020 | Nelson et al. |
| 10,841,307 | B2 | 11/2020 | Smith et al. |
| 10,846,762 | B1 | 11/2020 | Dennis et al. |
| 10,856,122 | B2 | 12/2020 | Smith et al. |
| 11,159,326 | B1 | 10/2021 | Nelson et al. |
| 11,190,355 | B2 | 11/2021 | Wang |
| 11,196,573 | B2 | 12/2021 | Roennow et al. |
| 11,223,617 | B2 | 1/2022 | Blinn et al. |
| 11,303,610 | B2 | 4/2022 | Kamdar et al. |
| 11,356,479 | B2 | 6/2022 | Prakash et al. |
| 11,367,060 | B1* | 6/2022 | Barbashin .......... H04N 21/2743 |
| 11,388,165 | B2 | 7/2022 | Epstein et al. |
| 11,552,923 | B2 | 1/2023 | Stahura et al. |
| 11,558,344 | B1 | 1/2023 | Pezeshki et al. |
| 11,750,570 | B1 | 9/2023 | Eby et al. |
| 11,830,330 | B1 | 11/2023 | Island et al. |
| 11,870,750 | B1 | 1/2024 | Shah et al. |
| 11,876,801 | B2 | 1/2024 | Smith et al. |
| 11,886,425 | B2 | 1/2024 | Pezeshki et al. |
| 2002/0065903 | A1 | 5/2002 | Fellman |
| 2006/0218289 | A1 | 9/2006 | Assad |
| 2007/0294431 | A1 | 12/2007 | Adelman et al. |
| 2010/0325128 | A1 | 12/2010 | Adelman et al. |
| 2011/0055248 | A1 | 3/2011 | Consuegra et al. |
| 2011/0055331 | A1 | 3/2011 | Adelman et al. |
| 2011/0055562 | A1 | 3/2011 | Adelman et al. |
| 2012/0072572 | A1 | 3/2012 | Bladel |
| 2012/0166935 | A1 | 6/2012 | Abhyanker |
| 2013/0262416 | A1 | 10/2013 | Devarajan et al. |
| 2013/0326368 | A1 | 12/2013 | Voas et al. |
| 2014/0188681 | A1 | 7/2014 | Shahghasemi |
| 2014/0283106 | A1 | 9/2014 | Stahura et al. |
| 2015/0100507 | A1 | 4/2015 | Levac et al. |
| 2015/0302053 | A1 | 10/2015 | Mitnick et al. |
| 2015/0356523 | A1 | 12/2015 | Madden |
| 2016/0055490 | A1 | 2/2016 | Keren et al. |
| 2016/0217436 | A1 | 7/2016 | Brama |
| 2016/0241510 | A1 | 8/2016 | Kamdar et al. |
| 2016/0330027 | A1 | 11/2016 | Ebrahimi |
| 2017/0132626 | A1* | 5/2017 | Kennedy .............. G06Q 20/065 |
| 2017/0236123 | A1 | 8/2017 | Ali et al. |
| 2017/0331896 | A1* | 11/2017 | Holloway ............... H04L 67/04 |
| 2018/0246983 | A1 | 8/2018 | Rathod |
| 2019/0028432 | A1 | 1/2019 | Li et al. |
| 2019/0096021 | A1 | 3/2019 | Jarvis et al. |
| 2019/0130399 | A1* | 5/2019 | Wright ................. G06Q 20/401 |
| 2019/0163887 | A1 | 5/2019 | Frederick et al. |
| 2019/0279204 | A1 | 9/2019 | Norton et al. |
| 2019/0306158 | A1 | 10/2019 | Jain |
| 2019/0340607 | A1* | 11/2019 | Lynn .................. G06Q 20/4014 |
| 2020/0019680 | A1 | 1/2020 | Frederick et al. |
| 2020/0036707 | A1 | 1/2020 | Callahan et al. |
| 2020/0145373 | A1 | 5/2020 | Richardson |
| 2020/0186338 | A1 | 6/2020 | Andon et al. |
| 2020/0202668 | A1 | 6/2020 | Cotta |
| 2020/0406859 | A1 | 12/2020 | Hassani |
| 2021/0058353 | A1 | 2/2021 | Creech et al. |
| 2021/0097508 | A1 | 4/2021 | Papnikolas |
| 2021/0256070 | A1* | 8/2021 | Tran .................. G06F 16/90332 |
| 2021/0326857 | A1* | 10/2021 | Yantis .................. G06Q 20/123 |
| 2021/0357489 | A1 | 11/2021 | Tali et al. |
| 2022/0021537 | A1 | 1/2022 | Wagner et al. |
| 2022/0131844 | A1* | 4/2022 | Sherlock ............... H04L 63/105 |
| 2022/0173893 | A1* | 6/2022 | Basu ..................... H04L 9/3247 |
| 2022/0198049 | A1 | 6/2022 | Dumas et al. |
| 2022/0198444 | A1 | 6/2022 | Mee et al. |
| 2022/0201036 | A1 | 6/2022 | Nabeel et al. |
| 2022/0222245 | A1 | 7/2022 | Pezeshki et al. |
| 2022/0270725 | A1* | 8/2022 | Derosa-Grund .... G06F 16/2365 |
| 2022/0294630 | A1 | 9/2022 | Collen |
| 2022/0342958 | A1 | 10/2022 | Lillard et al. |
| 2022/0351165 | A1* | 11/2022 | Regenor ................. G06F 21/10 |
| 2022/0383296 | A1 | 12/2022 | Gottschalk |
| 2022/0414621 | A1* | 12/2022 | Parlotto .................. G06F 21/64 |
| 2023/0057438 | A1 | 2/2023 | Chen et al. |
| 2023/0171225 | A1 | 6/2023 | Pezeshki et al. |
| 2023/0306443 | A1 | 9/2023 | Murphy |
| 2023/0336523 | A1 | 10/2023 | DeLuca et al. |
| 2023/0360031 | A1 | 11/2023 | DeLuca et al. |
| 2023/0403154 | A1 | 12/2023 | Kaizer et al. |
| 2023/0403254 | A1 | 12/2023 | Kaizer et al. |
| 2023/0418979 | A1 | 12/2023 | DeLuca et al. |
| 2023/0421399 | A1 | 12/2023 | Quirk et al. |
| 2024/0056525 | A1 | 2/2024 | DeLuca |
| 2024/0146523 | A1 | 5/2024 | DeLuca et al. |

OTHER PUBLICATIONS

Mitchell Anicas, "An Introduction to OAuth 2", DigitalOcean, https://www.digitalocean.com/community/tutorials/an-introduction-to-oauth-2, Jul. 21, 2014, 14 pages.

Wikipedia, "Blockchain", https://en.wikipedia.org/wiki/Blockchain, downloaded from the internet on Mar. 25, 2022, 27 pages.

"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.

Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.

"DNS Records Explained—Domain Name System Management", Domain.com, https://www.domain.com/help/article/dns-management-dns-records-explained, downloaded from the internet on Mar. 25, 2022, 5 pages.

Michele D'Aliessi, "How Does the Blockchain Work? A Guide to Everything You Need to Know", OneZero, https://onezero.medium.com/how-does-the-blockchain-work-98c8cd01d2ae, Jun. 1, 2016, 21 pages.

Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.

Amaury Martiny, "One-click Login with Blockchain: A MetaMask Tutorial", https://www.toptal.com/ethereum/one-click-login-flows-a-metamask-tutorial, downloaded from the internet on Mar. 25, 2022, 16 pages.

James Beck, Blog, "Mirror.xyz Review: How To Use MetaMask To Compete In The $WRITE Race", Jul. 30, 2021, https://consensys.net/blog/metamask/mirror-xyz-review-how-to-use-metamask-to-compete-in-the-write-race, 14 pages.

"Twitter verification requirements—how to get the blue check", https://help.twitter.com/en/managing-your-account/about-twitter-verified-accounts, downloaded from the internet on Mar. 25, 2022, 19 pages.

"Verify your site ownership—Search Console Help", https://support.google.com/webmasters/answer/9008080?hl=en#zippy=%2Chtml-file-upload, downloaded from the internet on Mar. 25, 2022, 5 pages.

(56) References Cited

OTHER PUBLICATIONS

Antoni Zolciak, "Beyond KYC: Stricter Privacy Policies are Looming, But DeFi is Here to Stay", https://www.nasdaq.com/articles/beyond-kyc%3A-stricter-privacy-policies-are-looming-but-defi-is-here-to-stay, Dec. 8, 2021, 7 pages.

"Humanity Check Overview", https://docs.unstoppabledomains.com/login-with-unstoppable/humanity-check/humanity-check-for-login/, downloaded from the internet on Apr. 7, 2022, 5 pages.

Jennifer Lowe, "What is KYC and why does it matter?", Plaid.com, Aug. 12, 2021, 15 pages.

Edward Jones, "How to Deplpoy NFT Smart Contracts", Better Programming, Dec. 2, 2021, https://betterprogramming.pub/how-to-deploy-nft-smart-contracts-9271ce5e91c0, 20 pages.

Jason Nelson, "Rug Pulls Force Solana NFT Marketplace Magic Eden to Invoke Doxing Policy for Creators", Decrypt, Feb. 21, 2022, https://decrypt.co/93474/rug-pulls-solana-nft-marketplace-magic-eden-doxing-policy-launchpad, 8 pages.

International Search Report and Written Opinion in corresponding International Application No. PCT/US23/66535, mailed Sep. 29, 2023, 8 pages.

"Ethereum Gas Tracker", downloaded from the internet on Feb. 28, 2024, 4 pages.

"Alchemy API Reference Overview", downloaded from the internet on Feb. 28, 2024, https://docs.alchemy.com/reference/api-overview, 8 pages.

Samaneh Tajalizadehkhoob, "New ICANN Project Explores the Drivers of Malicious Domain Name Registrations", ICANN Blogs, https://www.icann.org/en/blogs/details/new-icann-project-explores-the-drivers-of-malicious-domain-name-registrations-25-04-2023-en, Apr. 25, 2023, 3 pages.

"Why Are Some Domains Protected?", Unstoppable Domains, Mar. 11, 2022, https://support.unstoppabledomains.com/support/solutions/articles/48001186091-why-are-some-domains-protected, 3 pages.

"What is a non-fungible token (NFT)?", https://www.coinbase.com/learn/crypto-basics/plp-what-is-nft, downloaded from the internet on Mar. 25, 2022, 10 pages.

"Unstoppable Domains launches Login with Unstoppable", https://unstoppabledomains.com/blog/introducing-login-with-unstoppable, Jan. 9, 2022, 7 pages.

"ERC: Claim Holder—Issue #735", https://github.com/ethereum/eips/issues/735, GitHub, ethereum/EIPs, downloaded from the internet on Oct. 14, 2022, 21 pages.

"LIPs/LSPs/LSP-6-KeyManager.md", GitHub, lukso-network/LIPS, https://github.com/lukso-network/LIPs/blob/main/LSPs/LSP-6-KeyManager.md, downloaded from the internet on Oct. 14, 2022, 13 pages.

"Allowlists, denylists, and approved senders", Google Workspace Admin Help, https://support.google.com/a/answer/60752?hl=en#:~:text=Email allowlist—A list of,allowlist the contact's IP address 1, downloaded from the internet on Oct. 31, 2022, 1 page.

"S/MIME Digital Signatures", GlobalCerts, https://globalcerts.com/smime-digital-signatures, downloaded from the internet on Oct. 31, 2022, 5 pages.

"Progressive risk segmentation: your secret to balancing fraud prevention and conversion", https://withpersona.com, downloaded from the internet on Apr. 1, 2022, 7 pages.

Alex Gomez, "Unstoppable Domains Email (What Is it and How Does it Work?)", Cyber Scrilla, https://cyberscrilla.com/unstoppable-domains-email/#:~:text=How, Sep. 1, 2022, 43 pages.

Adriel Estrada, "Introducing Unstoppable Email with Skiff", Unstoppable Domains, https://unstoppabledomains.com/blog/categories/announcements/article/unstoppable-email-skiff, Aug. 30, 2022, 7 pages.

International Search Report and Written Opinion in International Application No. PCT/US23/68858, dated Oct. 19, 2023, 8 pages.

"DNS records for unstoppabledomains.com", Unstoppable Domains, https://www.nslookup.io/domains/unstoppabledomains.com/dns-records/, downloaded from the internet on Nov. 16, 2023, 5 pages.

International Search Report and Written Opinion in International Application No. PCT/US23/71399, dated Nov. 16, 2023, 10 pages.

Jeff Benson, "You Can Now Use Your .com Domain to Send and Receive Ethereum", https://decrypt.co/79517/you-can-now-use-your-com-domain-send-receive-ethereum Decrypt, Aug. 26, 2021, 8 pages.

"Claim your DNS name onchain in ENS", ENS, https://support.ens.domains/en/articles/7882690-claim-your-dns-name, downloaded from the internet on Feb. 9, 2024, 10 pages.

"Ethereum Name Service (ENS)", https://etherscan.io/token/0xc18360217d8f7ab5e7c516566761ea12ce7f9d72#readContract, downloaded from the internet on Feb. 9, 2024, 4 pages.

"Ethereum Name Service (ENS)", https://etherscan.io/token/0xc18360217d8f7ab5e7c516566761ea12ce7f9d72#writeContract, downloaded from the internet on Feb. 9, 2024, 2 pages.

"Unstoppable Domains (UD)", https://polygonscan.com/token/0xa9a6a3626993d487d2dbda3173cf58ca1a9d9e9f#readProxyContract, downloaded from the internet on Feb. 9, 2024, 3 pages.

"Unstoppable Domains (UD)", https://polygonscan.com/token/0xa9a6a3626993d487d2dbda3173cf58ca1a9d9e9f#writeProxyContract, downloaded from the internet on Feb. 9, 2024, 3 pages.

"Introducing Blend: the Peer-to-Peer Perpetual Lending Protocol for NFT's", https://x.com/blur_io/status/1653051809240604674?s=20, downloaded from the internet Jun. 26, 2024, 2 pages.

Owen Fernau, "Blur Launches NFT Lending Protocol", The Defiant, https://thedefiant.io/news/nfts-and-web3/blur-nft-lending, May 2, 2023, 7 pages.

"NFTs and Real-World Assets: A match made in heaven", Brú Finance, Mar. 14, 2024, https://medium.com/bru-finance/nfts-and-real-world-assets-a-match-made-in-heaven-6deb5365a343, 9 pages.

https://data.iana.org/TLD/tlds-alpha-by-domain.txt, downloaded from the internet on Aug. 30, 2024, 23 pages.

Wikipedia, "List of Internet top-level domains", https://en.wikipedia.org/wiki/List_of_Internet_top-level_domains, downloaded from the internet on Aug. 30, 2024, 67 pages.

International Preliminary Report on Patentability in corresponding International Application No. PCT/US2023/066535, issued Oct. 29, 2024, 7 pages.

\* cited by examiner

CONTROLLING PUBLISHING OF ASSETS ON A BLOCKCHAIN

BACKGROUND

1. Technical Field

Present invention embodiments relate to managing assets on a blockchain, and more specifically, to verifying users publishing (or minting) non-fungible tokens (NFTs) or other assets on a blockchain in order to provide trusted publishing (or minting) and reduce malicious activity pertaining to fraudulent assets.

2. Discussion of the Related Art

A non-fungible token (NFT) is a digital certificate of authenticity used to assign and verify ownership of a unique digital or physical item. In contrast to fungible tokens, non-fungible tokens (NFTs) are not interchangeable with one another. For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Non-fungible tokens (NFTs) are growing in popularity, and represent a status symbol for those fortunate enough to participate early or can afford the significant prices.

However, a series of fraudulent activities has occurred concerning non-fungible tokens (NFTs). These activities include publishers or minters offering non-fungible tokens (NFTs) for sale for which the publishers or minters do not have the appropriate rights to the corresponding digital or physical item. This erodes trust with respect to proper transference of non-fungible tokens (NFTs) and corresponding items.

SUMMARY

According to one embodiment of the present invention, a system for controlling publishing of an asset on a blockchain comprises one or more memories and at least one processor coupled to the one or more memories. The system verifies a user requesting publishing of the asset on the blockchain. Verification information is generated that identifies the user and indicates successful verification of the user. The asset and the verification information are published on the blockchain. Embodiments of the present invention further include a method and computer program product (e.g., including one or more computer readable media with instructions executable by one or more processors) for controlling publishing of an asset on a blockchain in substantially the same manner described above.

BRIEF DESCRIPTION OF THE DRAWINGS

Generally, like reference numerals in the various figures are utilized to designate like components.

DETAILED DESCRIPTION

An embodiment of the present invention employs Know Your Customer (KYC) type verification during a publishing (or minting) process for non-fungible tokens (NFTs) or other assets to reduce malicious activity from fraudulent non-fungible tokens (NFTs) and incorporate trust through verification of an original publisher or minter.

A present invention embodiment verifies an identity of a user attempting to publish (or mint) a non-fungible token (NFT) or other asset. When the user is verified, verification information is stored on a blockchain in association with the non-fungible token (NFT). The verification process may verify a user via a social media or other account of the user, an electronic wallet of the user, Know Your Customer (KYC) type requirements (e.g., including biometrics of the user, etc.), and/or proof of registration of a domain name of the user on a domain based system.

By way of example, a malicious user may copy an instance of an item (e.g., artwork, etc.) of another user and publish (or mint) a fraudulent non-fungible token (NFT) for the item to a blockchain (e.g., a non-fungible token (NFT) published (or minted) by a user without appropriate rights for an associated item, etc.). The fraudulent non-fungible token (NFT) may further be posted to a network site to indicate availability for transference. A user with rights for the item may ascertain knowledge of the fraudulent non-fungible token (NFT) on the network site, and provide a notification of the unauthorized content to a service provider.

Although conventional approaches may remove the fraudulent non-fungible token (NFT) from the network site, the publisher identity remains unknown. Thus, there is no manner to ban or contact a malicious user, and the conventional approaches may enable users to repeatedly publish (or mint) fraudulent non-fungible tokens (NFTs).

Accordingly, the present invention embodiment stores verification information for the malicious user on the blockchain in association with the fraudulent non-fungible token (NFT). When the malicious user attempts to publish (or mint) another non-fungible token (NFT), the present invention embodiment verifies the identity of the malicious user and recognizes that the malicious user has a history of publishing (or minting) fraudulent non-fungible tokens (NFTs) based on the verification information stored in the blockchain for the prior fraudulent non-fungible token (NFT). In this case, the present invention embodiment denies publishing (or minting) of other non-fungible tokens (NFT) by the malicious user.

By way of example, present invention embodiments are described with respect to publishing (or minting) a non-fungible token (NFT). However, the present invention embodiments may be applied to any types of assets (e.g., fungible tokens, non-fungible tokens (NFTs), other crypto assets, etc.) to prevent malicious activity pertaining to fraudulent assets in substantially the same manner described below.

Figure 1:
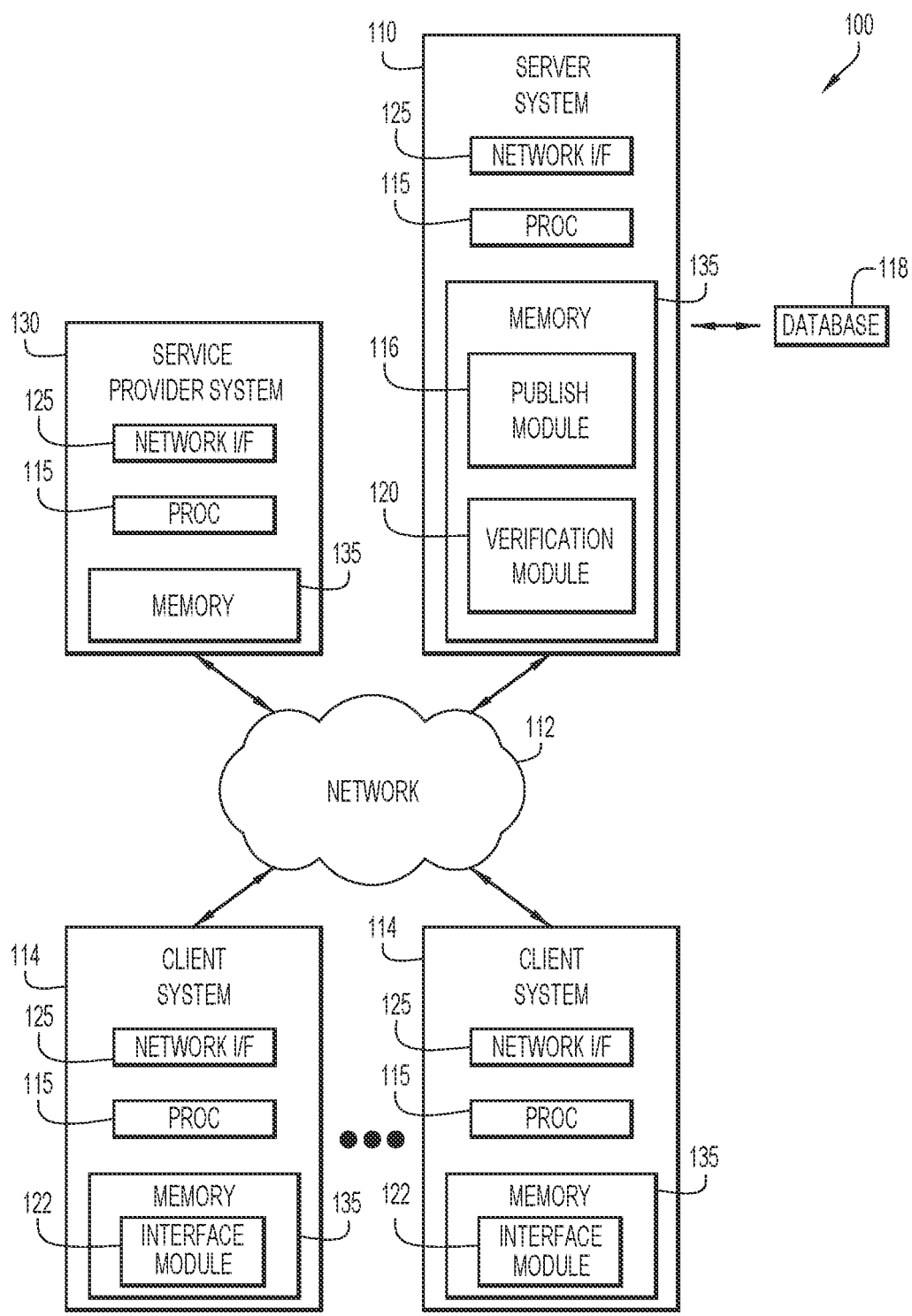
FIG. 1 is a diagrammatic illustration of an example computing environment according to an embodiment of the present invention.

An example environment 100 for use with present invention embodiments is illustrated in FIG. 1. Specifically, environment 100 includes one or more server systems 110, one or more client or end-user systems 114, and one or more service provider systems 130. Server systems 110, client systems 114, and service provider systems 130 may be remote from each other and communicate over a network 112. The network may be implemented by any number of any suitable communications media (e.g., wide area network (WAN), local area network (LAN), Internet, Intranet, etc.). Alternatively, server systems 110, client systems 114, and/or service provider systems 130 may be local to each other, and communicate via any appropriate local communication medium (e.g., local area network (LAN), hardwire, wireless link, Intranet, etc.).

Client systems 114 include an interface module 122 to enable users to submit requests to server systems 110 to publish (or mint) a non-fungible token (NFT). The interface module may include any conventional or other browser. The server systems include a publish module 116 and a verification module 120. The publish module interfaces with a user via client system 114 to publish (or mint) a non-fungible token (NFT) on a blockchain, while verification module 120 verifies a user identity and prior history with respect to publishing (or minting) fraudulent non-fungible tokens (NFTs) (e.g., a non-fungible token (NFT) from a user without appropriate rights for the corresponding item, etc.). Server systems 110 may further provide implementation and management of blockchains. The service provider systems 130 may include any third party or other server systems implementing or providing blockchains, various social media or other network sites, and/or other services (e.g., blockchain management, domain registry management, user accounts of network sites, etc.).

A database system 118 may store various information for the analysis (e.g., mappings of users to social media or other accounts, listing of users associated with fraudulent assets, etc.). The database system may be implemented by any conventional or other database or storage unit, may be local to or remote from server systems 110, client systems 114, and/or service provider systems 130, and may communicate via any appropriate communication medium (e.g., local area network (LAN), wide area network (WAN), Internet, hardwire, wireless link, Intranet, etc.). The client systems 114 may present a graphical user (e.g., GUI, etc.) or other interface (e.g., command line prompts, menu screens, etc.) to interact with users pertaining to the desired publishing (or minting) of non-fungible tokens (NFTs), and may provide reports or notifications pertaining to publishing (or minting) (e.g., results of publishing (or minting), results of verification of user identity, identification of a malicious user, etc.).

Server systems 110 and client systems 114 may be implemented by any conventional or other computer systems preferably equipped with a display or monitor, a base, optional input devices (e.g., a keyboard, mouse or other input device), and any software for use by present invention embodiments (e.g., server/communications software, blockchain software, publish module 116, verification module 120, interface module 122, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.)).

Service provider systems 130 may be implemented by any conventional or other computer systems preferably equipped with a display or monitor, a base, optional input devices (e.g., a keyboard, mouse or other input device), and any commercially available or custom software (e.g., server/communications software, social media or other network site software, service software, blockchain software, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.).

Publish module 116, verification module 120, and interface module 122 may include one or more modules or units to perform the various functions of present invention embodiments described below. The various modules (e.g., publish module 116, verification module 120, interface module 122, etc.) may be implemented by any combination of any quantity of software and/or hardware modules or units, and may reside within memory 135 of the server and/or client systems for execution by a corresponding processor 115.

Figure 2:
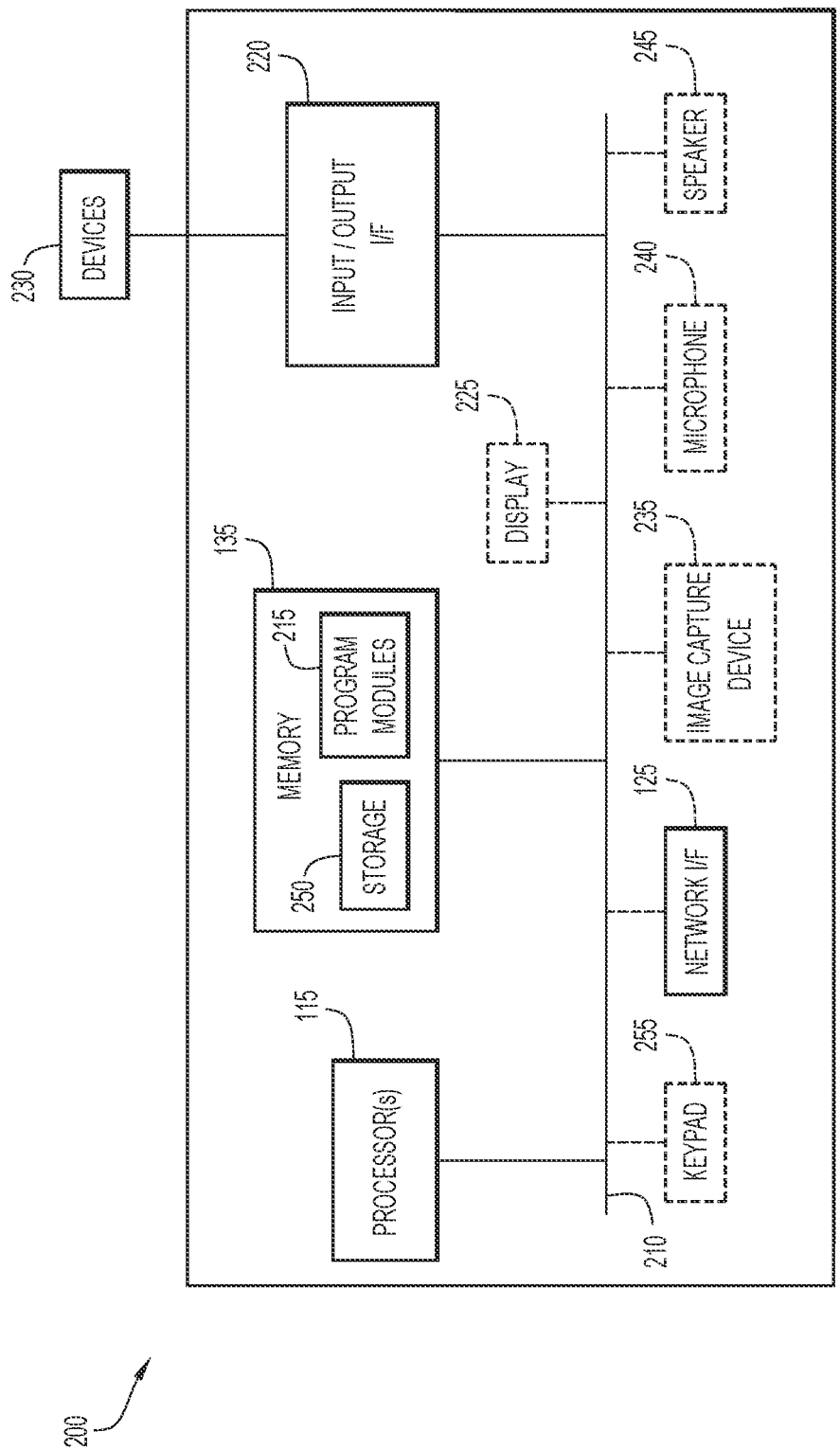
FIG. 2 is a block diagram of an example computing device according to an embodiment of the present invention.

An example of a computing device 200 of environment 100 (e.g., implementing server system 110, client system 114, and/or service provider system 130) is illustrated in FIG. 2. The example computing device may perform the functions described herein. Computing device 200 may be implemented by any personal or other type of computer or processing system (e.g., desktop, laptop, hand-held device, smartphone or other mobile device, etc.), and may be used for any computing environments (e.g., cloud computing, client-server, network computing, mainframe, stand-alone systems, etc.).

Computing device 200 may include one or more processors 115 (e.g., microprocessor, controller, central processing unit (CPU), etc.), network interface 125, memory 135, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 135 is coupled to bus 210 and typically includes computer readable media including volatile media (e.g., random access memory (RAM), cache memory, etc.), non-volatile media, removable media, and/or non-removable media. For example, memory 135 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 135 includes a set of program modules 215 (e.g., corresponding to publish module 116, verification module 120, interface module 122, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, biometric sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 125 coupled to bus 210.

With respect to certain entities (e.g., client system 114, etc.), computing device 200 may further include, or be coupled to, a touch screen or other display 225, a camera or image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

Initially, minting is basically an act of publishing a unique instance of a non-fungible token (NFT) on a blockchain. A blockchain is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alter the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a de-centralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFTs), etc.). For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

In addition, a blockchain may store software (e.g., typically referred to as smart contracts) that executes in response to occurrence of pre-defined conditions. A smart contract is generally software or a program that runs on the blockchain. The code and data for the smart contract reside at a specific address on the blockchain. Non-fungible tokens (NFTs) are controlled by smart contracts that handle transference and verification of ownership of the non-fungible tokens (NFTs). A blockchain may be public (e.g., no access restrictions, etc.), private (e.g., restricted access, etc.), or hybrid (e.g., with centralized and de-centralized features).

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., name, address, email, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that alter content and/or functionality for the blockchain domain name.

Figure 3:
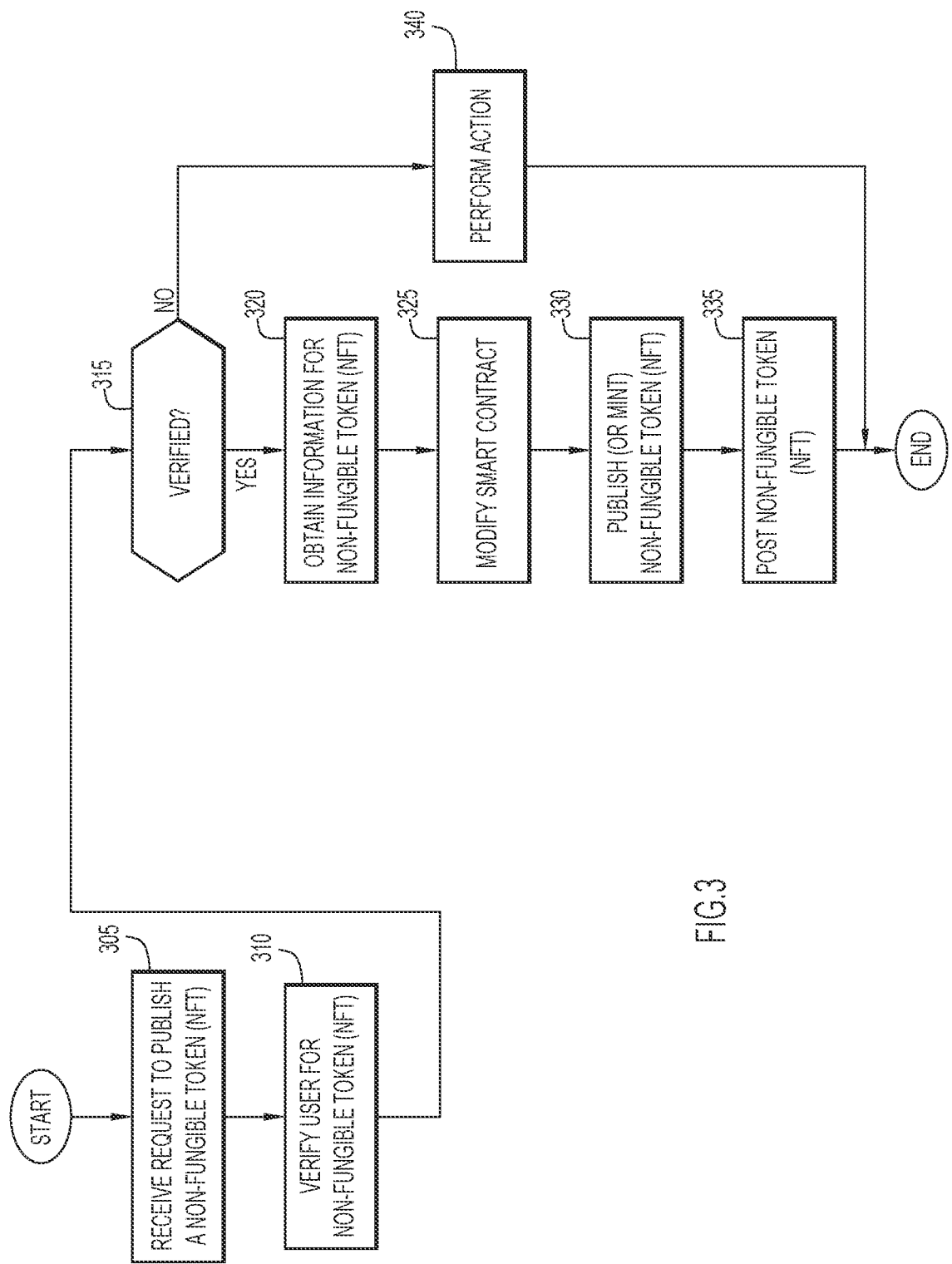
FIG. 3 is a flowchart of a method of publishing (or minting) a non-fungible token (NFT) on a blockchain according to an embodiment of the present invention.

A method of publishing (or minting) a non-fungible token (NFT) on a blockchain (e.g., via registration module 116, verification module 120, and server system 110 and/or client system 114) according to an embodiment of the present invention is illustrated in FIG. 3. Initially, a user desires to publish (or mint) a non-fungible token (NFT) on a blockchain. The non-fungible token (NFT) may correspond to a digital or physical item, and may be posted on a network site to indicate availability for transference. For example, the user may navigate to the network site via client system 114 to create a non-fungible token (NFT) that may be posted and transferred, and proceeds through a submission process. A request for creating the non-fungible token (NFT) is sent to server system 110 from a client system 114. Information for the non-fungible token (NFT) (e.g., name for the non-fungible token (NFT), file of a digital item to upload, etc.) may be entered on a user interface of client system 114 (e.g., FIG. 10) and provided in the request. The request is received and processed by publish module 116 of server system 110 at operation 305.

Once the information for the non-fungible token (NFT) is obtained, an identity of the user requesting publication (or minting) of the non-fungible token (NFT) is verified by verification module 120 at operation 310. This provides information to identify a user in case of publishing (or minting) a fraudulent non-fungible token (NFT) (e.g., a non-fungible token (NFT) published (or minted) by a user without appropriate rights for an associated item, etc.). The verification may be performed in various manners. For example, the verification may include detecting performance by the user of an operation requiring authentication of the user (e.g., access or use of an account or information of the user that is password or otherwise protected, etc.). By way of example, verification module 120 may request the user perform certain actions in a user social media or other account (e.g., log in, post information, etc.). Verification module 120 confirms appropriate performance of the actions to verify the user for publishing (or minting) the non-fungible token (NFT) as described below.

By way of further example, verification module 120 may utilize a wallet of the user to verify the user. Further, a Know Your Customer (KYC) type verification may be employed to verify the user. This may include comparing biometrics of the user to biometrics provided on a government or other officially-issued identification of the user. In addition, proof of registration of a domain name owned by the user may be utilized to verify the user.

The manners of verification may be used individually, or in any combination, to verify the user. In addition, verification information may be produced for a successful verification to identify the user, and may include a unique verification identifier, a human readable blockchain based identifier (e.g., blockchain or non-fungible token (NFT) domain name, etc.), and/or a wallet address (or other unique crypto identifier) for the user. The verification identifier may include any identifier unique to each new verified person (e.g., remains the same for the same person), and may be a randomly generated number or sequence. Further, user information from the verification may include, or be used to search and/or ascertain, the blockchain based identifier and/or wallet address for the user. The verification identifier may be stored and associated with the blockchain based identifier to indicate prior user verification and enable use of the blockchain based identifier for verification purposes.

When the user is verified as determined at operation 315, publish module 116 publishes (or mints) the non-fungible token (NFT) on a blockchain. For example, the publish module obtains information for the non-fungible token (NFT) at operation 320. The information may be obtained from a user interface of client system 114, and may include a recipient or wallet address for receiving the published (or minted) non-fungible token (NFT), and a tokenURI for the non-fungible token (NFT) typically in the form of a string that resolves to a JavaScript Object Notation (JSON) document describing metadata for the non-fungible token (NFT).

In order to track identities of users, publish module 116 may further modify a smart contract for the non-fungible token (NFT) at operation 325. This basically stores additional information or software code in the smart contract pertaining to the verification of the user. For example, the smart contract may be modified to include verification information including the unique verification identifier, the human readable blockchain based identifier (e.g., blockchain or non-fungible token (NFT) domain name, etc.), and/or the wallet address (or other unique crypto identifier) for the user.

Further, publish module 116 may modify the software code or logic of the smart contract to perform certain functions pertaining to a malicious user. For example, the modified smart contract may identify a malicious user based on a comparison of verification information, provide notifications concerning a fraudulent non-fungible token (NFT) and/or malicious user, prevent publishing (or minting) by a malicious user, perform other actions, etc.

In addition, verification may be based on Know Your Customer (KYC) type requirements (e.g., without having access to smart contracts). In this case, a user may initially be verified based on various Know Your Customer (KYC) type requirements, and may utilize the Know Your Customer (KYC) verification to proceed with the publishing (or minting) of the non-fungible token (NFT) with reduced verification requirements. A modified user interface may be provided based on the Know Your Customer (KYC) verification. Accordingly, a different user experience may be provided for verified users to prioritize and streamline creation of the non-fungible token (NFT).

Publish module 116 publishes (or mints) the non-fungible token (NFT) with the information and modified smart contract on the blockchain at operation 330. In addition, the non-fungible token (NFT) is placed in, or associated with, a user wallet. The smart contract may include new software code and/or modified software code with the verification information and any new actions or functionality.

Once the non-fungible token (NFT) is placed on the blockchain, publish module 116 posts the non-fungible token (NFT) and modified smart contract at operation 335. For example, the non-fungible token (NFT) and modified smart contract may be placed on a network site to indicate availability of the non-fungible token (NFT) and enable transference to other users.

When the user is not verified as determined at operation 315, various actions may be performed at operation 340. For example, publish module 116 may deny publication (or minting) of the requested non-fungible token (NFT), and/or provide a notification or error message indicating failure of the verification.

The above process may be repeated to request a different non-fungible token (NFT) for publication (or minting), and/or repeat the verification process for a denied request, in substantially the same manner described above.

Figure 4:
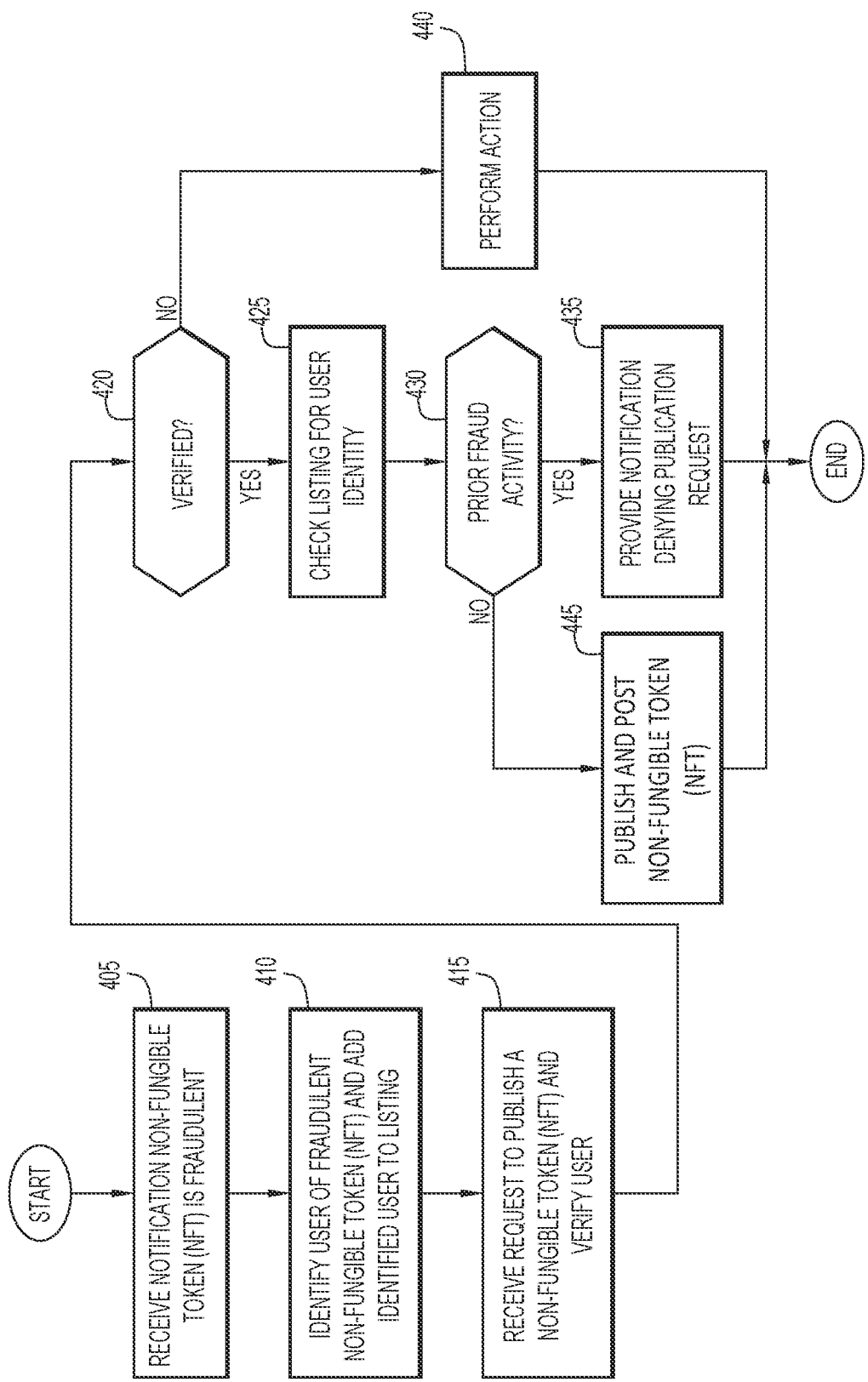
FIG. 4 is a flowchart of a method of controlling publishing (or minting) of a non-fungible token (NFT) on a blockchain based on verifying a user for prior fraudulent activity according to an embodiment of the present invention.

A manner of controlling publishing (or minting) of a non-fungible token (NFT) on a blockchain based on verifying a user for prior fraudulent activity (e.g., via publish module 116, verification module 120 and server system 110 and/or client system 114) according to an embodiment of the present invention is illustrated in FIG. 4. Initially, non-fungible tokens (NFTs) are published (or minted) on a blockchain, while user identities associated with the publishing (or minting) are captured and stored on the blockchain in substantially the same manner described above.

A notification is received that a published (or minted) non-fungible token (NFT) is fraudulent at operation 405. The notification may be provided by a rightful owner or creator of an item corresponding to the fraudulent non-fungible token (NFT), and may include any type of electronic or other notification (e.g., email, text message, voice communication, etc.). Verification module 120 may identify the user publishing (or minting) the fraudulent non-fungible token (NFT) at operation 410. The user may be identified by searching the blockchain for the fraudulent non-fungible token (NFT) and accessing the corresponding modified smart contract containing the verification information identifying the user (e.g., unique verification identifier, human readable blockchain based identifier (e.g., blockchain or non-fungible token (NFT) domain name, etc.), wallet address, etc.). In addition, the verification information of the user (e.g., unique verification identifier, human readable blockchain based identifier (e.g., blockchain or non-fungible token (NFT) domain name, etc.), wallet address, etc.) may be stored in a listing of users associated with fraudulent non-fungible tokens (NFTs). The listing may be stored in database system 118, and include any information (e.g., user information, verification information, non-fungible token (NFT) information, etc.).

A request is sent from client system 114 to server system 110 to publish (or mint) a non-fungible token (NFT). The request is associated with a user, and is received and processed by publish module 116 at operation 415 in substantially the same manner described above. The user is also verified by verification module 120 at operation 415, where verification information for the user is produced (e.g., unique verification identifier, human readable blockchain based identifier (e.g., blockchain or non-fungible token (NFT) domain name, etc.), wallet address, etc.) in substantially the same manner described above.

When the user is verified as determined at operation 420, verification module 120 searches the listing of users associated with fraudulent non-fungible tokens (NFTs) published on the blockchain to determine a presence of the user at operation 425. This may be accomplished by comparing the verification information of the user (e.g., unique verification identifier, human readable blockchain based identifier (e.g., blockchain or non-fungible token (NFT) domain name, etc.), wallet address, etc.) with the verification information of users in the listing. The user is present in the listing when the verification information of the user matches verification information of a user in the listing. The presence of the user in the listing indicates that the user is associated with (e.g., published or minted) a fraudulent non-fungible token (NFT) on the blockchain (e.g., has a history of publishing (or minting) fraudulent non-fungible tokens (NFTs) on the blockchain).

When the user is associated with at least one fraudulent non-fungible token (NFT) as determined at operation 430, publish module 116 may provide notification indicating the user has a history of fraudulent activity on a user interface of client system 114 (e.g., FIG. 12), and deny the request for publication (or minting) at operation 435.

When the user is not associated with at least one prior fraudulent non-fungible token (NFT) as determined at operation 430, publish module 116 may proceed to publish (or mint) the non-fungible token (NFT), and post the non-fungible token (NFT) to the network site at operation 445 in substantially the same manner described above.

When the user is not verified as determined at operation 420, various actions may be performed at operation 440. For example, publish module 116 may deny publication (or minting) of the requested non-fungible token (NFT), and/or provide a notification or error message indicating failure of the verification.

The above process may be repeated for requests for a different non-fungible token (NFT) for publication (or minting), and/or repeat the verification process for a denied request, in substantially the same manner described above.

Figure 5:
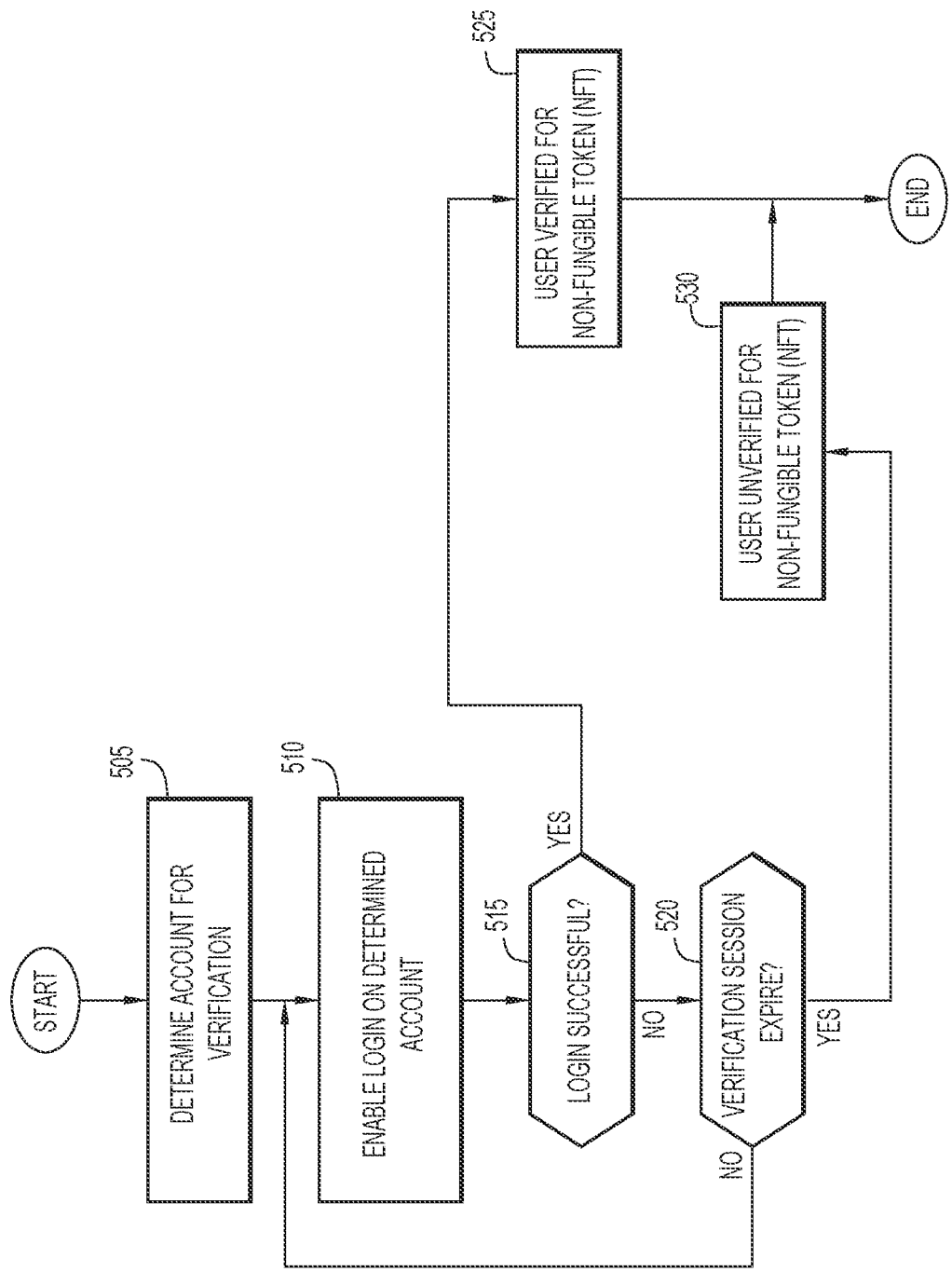
FIG. 5 is a flowchart of a manner of verifying a user publishing (or minting) a non-fungible token (NFT) on a blockchain based on access to an account of the user according to an embodiment of the present invention.

A manner of verifying a user publishing (or minting) a non-fungible token (NFT) on a blockchain based on access to a social media or other account (e.g., via verification module 120 and server system 110 and/or client system 114) according to an embodiment of the present invention is illustrated in FIG. 5. Initially, verification module 120 of server system 110 determines a social media or other account (e.g., social media account, wallet account, domain registration account, etc.) to use for verification of the user at operation 505. For example, the verification module may select an account from a pre-defined list and/or prompt the user for an account for the verification.

Further, verification module 120 may determine a set of social media or other accounts based on a search of network sites for a user name or other information received from the user on a user interface of client system 114. The search may retrieve user names or handles for the accounts. A social media or other account may be selected from the set of accounts based on a time period a social media or other account of the user has been active (e.g., the oldest active account, etc.), where older active social media or other accounts indicate greater trust of the identity of the user. Moreover, a social media or other account may be selected from the set of accounts based on an amount of followers, connections, or other linked accounts (e.g., greatest amount of followers, connections, or other linked accounts, etc.), where a greater number of followers, connections, or other linked accounts indicates greater trust of the identity of the user. In addition, a social media or other account may be selected from the set of accounts based on posts or other activity (e.g., greatest amount of posts or activity, etc.), where a greater number of posts or activity indicates greater trust of the identity of the user.

Once the social media or other account is selected, verification module 120 enables the user to log in or access the selected account at operation 510. The verification module may provide a link on a user interface of client system 114 (e.g., FIG. 11) to enable the user to log in or access the selected account. For example, the link may direct the user to a general login of the social media or other network account, where the user needs to enter the user name and password for the selected account. Alternatively, the link may direct the user to a specific login for the selected account (based on a provided user name), where the user needs to enter the password. The verification module listens for the response to the user login or access. This may be accomplished via any conventional or other mechanisms (e.g., Open Authorization (OAuth) protocol, etc.). For example, the user may provide authorization for the social media or other network site to provide certain information pertaining to the selected account to the verification module. In response to the authorization, the verification module may request a token from an authorization server based on proof of identity. The token is used by verification module 120 to access the information of the selected account from the social media or other network site to detect a successful login or access. This enables the verification module to access the selected account of the social media or other network site without receiving sensitive information (e.g., user name, passwords, etc.).

The login or access process is repeated until the user login or access is successful or a verification session has expired as determined at operations 515 and 520. The verification session may be based on a maximum number of login or access attempts and/or a predetermined time interval (or timeout). The maximum number of login or access attempts may be a predetermined number, and preferably in a range of one through five. However, any number of login or access attempts may be used. Moreover, verification module 120 may set a time interval (or timeout) for a successful login or access. The time interval is preferably in a range of one through five minutes, but any time interval may be utilized. When a successful login or access has not occurred prior to attaining the maximum number of login or access attempts and/or prior to the expiration of the time interval, the user verification is unsuccessful.

When a successful login or access has not occurred prior to expiration of the verification session as determined at operation 520, the user verification fails and the user is determined to be unverified for the requested non-fungible token (NFT) at operation 530. Publish module 116 may perform various actions in response to this determination including denying publication (or minting) of the requested non-fungible token (NFT), and/or providing a notification or error message indicating failure of the verification as described above.

When the response to the user login or access indicates a successful login or access prior to expiration of the verification session as determined at operation 515, the user is determined to be verified for the requested non-fungible token (NFT) at operation 525. Verification module 120 produces verification information for the user (e.g., unique verification identifier, human readable blockchain based identifier (e.g., blockchain or non-fungible token (NFT) domain name, etc.), etc.), and publish module 116 may proceed to publish (or mint) and post the requested non-fungible token (NFT) as described above.

Figure 6:
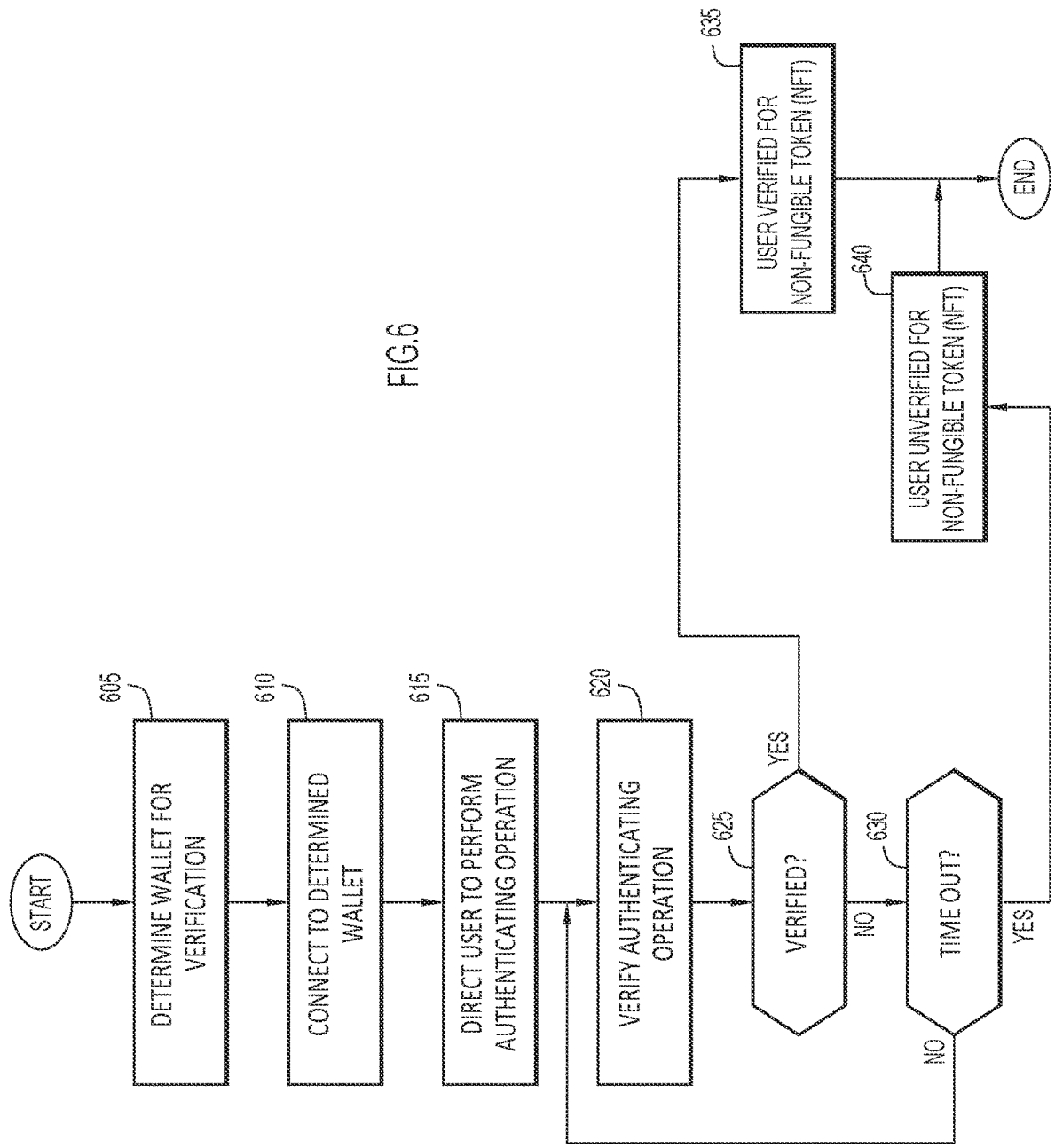
FIG. 6 is a flowchart of a manner of verifying a user publishing (or minting) a non-fungible token (NFT) on a blockchain based on verification of a wallet of the user according to an embodiment of the present invention.

A manner of verifying a user publishing (or minting) a non-fungible token (NFT) on a blockchain based on a user wallet (e.g., via verification module 120 and server system 110 and/or client system 114) according to an embodiment of the present invention is illustrated in FIG. 6. Initially, verification module 120 of server system 110 determines a wallet to use for verification of the user at operation 605. For example, the verification module may select a wallet from a pre-defined list and/or prompt the user for a wallet for the verification. Further, verification module 120 may determine a set of wallets based on a search of network sites for a user name or other information received from the user on a user interface of client system 114. A wallet may be selected from the set of wallets for verification of the user based on various factors (e.g., most activity or transactions, most recent activity or transaction, wallet with greatest value of assets, etc.).

Verification module 120 requests the user to access the selected wallet at operation 610, and to perform an operation to authenticate the user at operation 615. By way of example, the verification module may send a message to the selected wallet for the user to sign. This may be accomplished via an add-on or plug-in applied to interface module 122 (e.g., a browser, etc.).

The user logs in or otherwise accesses the selected wallet (e.g., via a user name and password, etc.) in order to sign the message and verify the user identity. Verification module 120 monitors the selected wallet for verification of the authenticating operation at operation 620 until a successful verification of the authenticating operation is detected or a time out has occurred (e.g., a time interval has expired) as determined at operations 625 and 630. The time out may be a predetermined time interval sufficient to enable the user to perform the authenticating operation, and preferably in a range from one through five minutes. However, any time interval may be used for the time out.

By way of example, signing of the message in the selected wallet generates a digital signature of the message based on the private key of the wallet. The signed message or digital signature is decrypted for verification (e.g., by the add-on or plug-in of interface module 122) based on the public key (e.g., blockchain address, etc.) corresponding to the selected wallet. Since the private key is unique to the selected wallet (or user), successful decryption of the message with the corresponding public key verifies the message was sent by the user. A response may be provided to the verification module (e.g., from the add-on or plug-in of interface module 122) indicating a result of the decryption of the signed message.

When the time out occurs (e.g., the predetermined time interval expires, etc.) without detecting a successful verification of the authenticating operation as determined at operation 630, the user verification fails. For example, the signed message may have failed the message verification (e.g., based on the response from the add-on or plug-in of interface module 122), or the user was unable to access the selected wallet to sign the message prior to occurrence of the timeout (e.g., expiration of the predetermined time interval, etc.). Accordingly, the user is determined not to be verified for the requested non-fungible token (NFT) at operation 640. Publish module 116 may perform various actions in response to this determination including denying publication (or minting) of the requested non-fungible token (NFT), and/or providing a notification or error message indicating failure of the verification as described above.

When the verification is successful (e.g., based on the response from the add-on or plug-in of interface module 122) prior to occurrence of the timeout (e.g., expiration of the predetermined time interval, etc.) as determined at operation 625, the user is determined to be verified for the requested non-fungible token (NFT) at operation 635. Verification module 120 produces verification information for the user (e.g., unique verification identifier, human readable blockchain based identifier (e.g., blockchain or non-fungible token (NFT) domain name, etc.), wallet address, etc.), and publish module 116 may proceed to publish (or mint) and post the requested non-fungible token (NFT) as described above.

Figure 7:
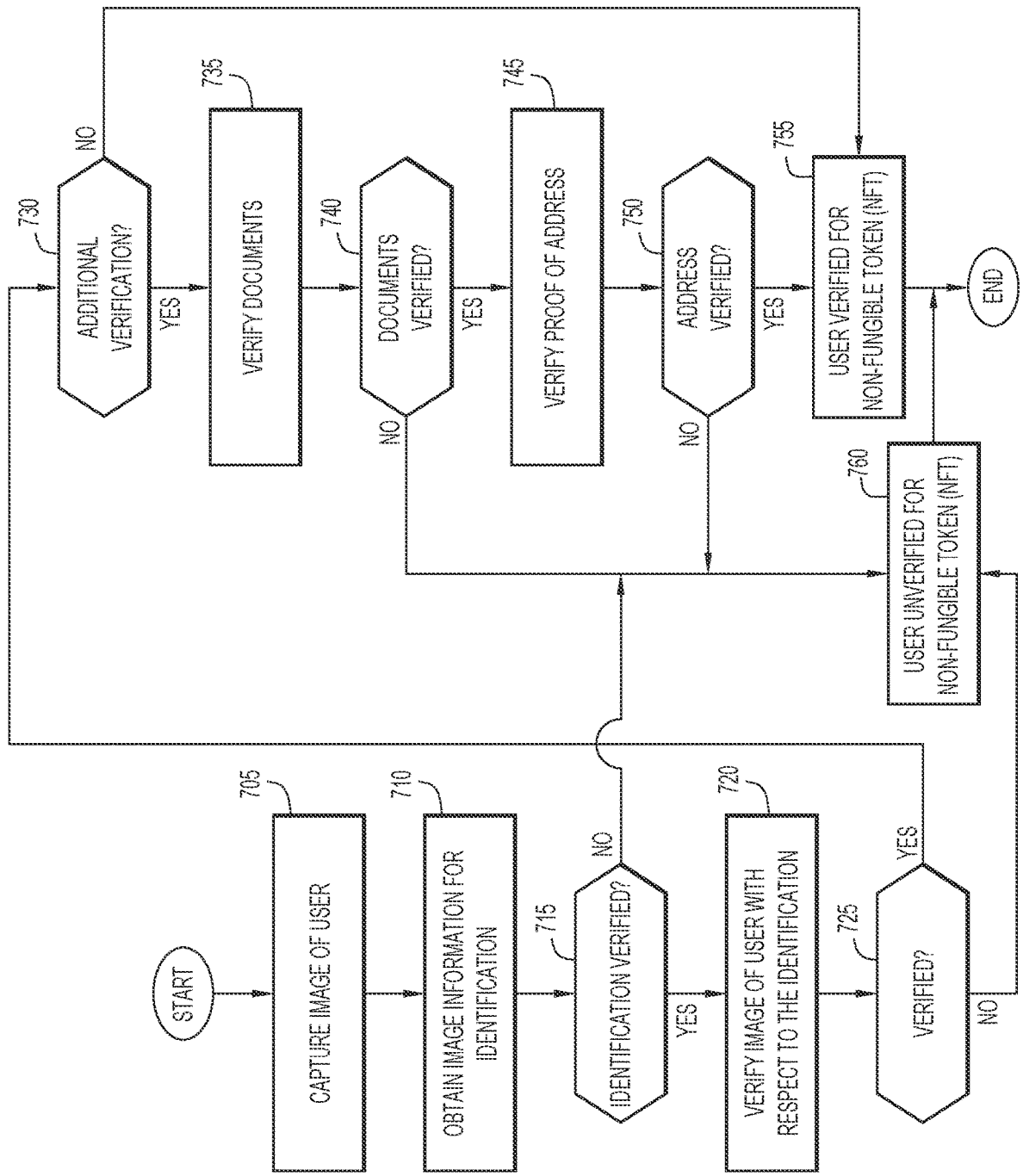
FIG. 7 is a flowchart of a manner of verifying a user publishing (or minting) a non-fungible token (NFT) on a blockchain based on a Know Your Customer (KYC) type verification according to an embodiment of the present invention.

A manner of verifying a user publishing (or minting) a non-fungible token (NFT) on a blockchain based on a Know Your Customer (KYC) or Identity Verification type method (e.g., via verification module 120 and server system 110 and/or client system 114) according to an embodiment of the present invention is illustrated in FIG. 7. Initially, a Know Your Customer (KYC) type method generally pertains to verifying a customer identity and assessing risk (e.g., with respect to compliance with Anti-Money Laundering (AML) and other laws, etc.). The method basically requires customers to provide documentation, and includes proof of customer identity, evaluation of a level of risk, and monitoring customer activity patterns.

The proof of customer identity requests information from a customer to prove customer identity, such as a government or other officially issued identification (e.g. driver's or other license, passport, etc.), financial references or statements, information from a consumer or other reporting agency or public database, etc. This may employ proof of identity (with a photograph or image) and proof of address. Proof of address may be shown based on a variety of documents (e.g., passport, driving license, utility bill (electricity, gas, etc.), telephone bill, bank statement, credit card statement, etc.).

The evaluation of a level of risk examines the types of activities or transactions of a customer to determine a risk level that indicates a frequency of monitoring. The monitoring customer activity patterns monitors customer activity or transactions for unusual or outlier activities. These may be performed by verification module 120 performing analysis of various user-provided documentation of user activity (e.g., financial or other transactions, etc.) or monitoring of user activity or transactions online. Identification of unusual activity or high risk may prevent verification of the user for publication (or minting) of the requested non-fungible token (NFT).

The various verifications of the Know Your Customer (KYC) type method may be performed manually and/or by verification module 120. For example, with respect to proof of identity, verification module 120 directs client system 114 of the user to capture an image of the user, preferably including a face of the user at operation 705. This may be accomplished by controlling image capture device 235 of the client system to capture the image.

Verification module 120 further directs client system 114 to obtain image information for an identification provided by the user at operation 710. The identification is preferably a government or other officially issued identification (e.g. driver's or other license, passport, etc.) including an image of a corresponding person, and is provided by the user for the image capture (e.g., in possession of the user, etc.). This may be accomplished by controlling image capture device 235 of the client system to capture an image of the identification. Alternatively, image information for the identification (e.g., an image of a person corresponding to the identification, etc.) may be obtained from a memory device of the identification.

Verification module 120 may initially verify the identification at operation 715. For example, conventional or other image analysis techniques may be employed to identify markings indicating authenticity of the identification (e.g., watermarks, codes, etc.). The authenticity information may alternatively be provided from a memory device of the identification. The biometric verification may proceed when the identification has been verified. When the identification is determined to not be authentic, the user may be requested to provide another identification. When a proper identification is not provided (e.g., within a predetermined number of attempts or a predetermined time interval, etc.), verification of the user fails and the user is determined not to be verified for the requested non-fungible token (NFT) at operation 760 as described below. The predetermined number of attempts may be any desired amount, preferably one through five. Similarly, the predetermined time interval may be any time interval, preferably in the range of one through five minutes.

When the identification has been verified as determined at operation 715, the image of the user is compared with the image for the identification to verify the user against the identification at operation 720. This may be accomplished by any conventional or other image processing techniques (e.g., facial recognition techniques, etc.). For example, the faces of persons may be detected within each of these images, and the corresponding pixels compared. A combination of the pixel differences (e.g., sum or weighted sum of the differences between values of corresponding pixels in the images, etc.) may be compared to a difference threshold. When the combination of the pixel differences satisfies the difference threshold (e.g., the difference between the images is sufficiently low, etc.), the user is considered to correspond to the identification.

Alternatively, feature vectors may be extracted from each of the images. A feature vector may include any suitable features (e.g., person features/dimensions, pixel features, pixel intensity, etc.). A conventional or other distance (e.g., cosine similarity, etc.) between the feature vectors may be determined and compared to a distance threshold. When the determined distance satisfies the distance threshold (e.g., the difference between the captured images is sufficiently low, etc.), the user is considered to correspond to the identification.

In addition, a machine learning model may be used to perform the image comparison. The machine learning model may be implemented by any conventional or other machine learning models (e.g., mathematical/statistical, classifiers, feed-forward, recurrent, convolutional or other neural networks, etc.). For example, neural networks may include an input layer, one or more intermediate layers (e.g., including any hidden layers), and an output layer. Each layer includes one or more neurons, where the input layer neurons receive input (e.g., image data, feature vectors of images, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of images as input and corresponding classifications as outputs, where the neural network attempts to produce the provided output (or classification) and uses an error from the output (e.g., difference between produced and known outputs) to adjust weight (and bias) values (e.g., via backpropagation or other training techniques).

In this example case, the machine learning may be performed using a training set of image information for different persons (e.g., images of persons and images for identifications) as input and known corresponding classifications (e.g., correspondence or non-correspondence) as output, where the neural network attempts to produce the provided output (or correspondence or non-correspondence classification). In an embodiment, the different combinations of images of persons and images for identifications may be used for the training set as input, while the corresponding known classifications (correspondence or non-correspondence) may be used for the training set as known output. In an embodiment, feature vectors may be extracted from the images and used for the training set as input, while the corresponding known classifications may be used for the training set as known output. A feature vector may include any suitable features (e.g., person features/dimensions, pixel features, etc.).

The output layer of the neural network indicates a classification (e.g., correspondence or non-correspondence, etc.) for input data. By way of example, the classes used for the classification may include a class associated with each of a correspondence and non-correspondence (e.g., indicating whether the images correspond to a same person, etc.). The output layer neurons may provide a classification that indicates a presence of a correspondence or non-correspondence when images of a person and for an identification are within input data. Further, output layer neurons may be associated with the different classes, and indicate a probability for the input data being within a corresponding class (e.g., probabilities of a correspondence and a non-correspondence, etc.). The class or identity associated with the highest probability is preferably selected as the class or result for the input data. The image of the user and the image for the identification are provided to the neural network, where the neural network indicates whether the user corresponds to the identification. For example, a resulting classification of correspondence indicates the user corresponds to the identification, and a resulting classification of non-correspondence indicates the user does not correspond to the identification.

When the proof of identity verification is successful (e.g., the user corresponds to the identification) as determined at operation 725, additional Know Your Customer (KYC) verification including proof of address may be employed based on various conditions. For example, a user may have been previously verified by a Know Your Customer (KYC) type verification (e.g., proof of identity, proof of address, user due diligence, user monitoring, etc.). An indication of a previous verification (e.g., verification identifier and/or associated blockchain identifier, etc.) may be stored (e.g., in database system 118), and used to avoid the additional verification for the user.

When additional verification is to be performed as determined at operation 730, the user may submit or upload one or more documents (or images of the documents) via a user interface of client system 114. For example, the documents may include a passport, a driving license, a utility bill (electricity, gas, etc.), telephone bill, a bank statement, a credit card statement, or any other document from an organization indicating an address of the user.

The documents are processed to verify proof of address of the user. Initially, each document may verified for authenticity at operation 735. For example, conventional or other image or document analysis techniques may be employed to identify markings indicating authenticity of a document (e.g., watermarks, codes, etc.). When a document is determined to not be authentic, the user may be requested to provide another document. When at least one proper document is not provided (e.g., within a predetermined number of attempts or a predetermined time interval, etc.) as determined at operation 740, verification of the user fails and the user is determined not to be verified for the requested non-fungible token (NFT) at operation 760 as described below. The predetermined number of attempts may be any desired amount, preferably one through five. Similarly, the predetermined time interval may be any time interval, preferably in the range of one through five minutes.

When at least one of the documents is considered authentic as determined at operation 740, the proof of address is determined at operation 745. For example, natural language processing and/or other techniques (e.g., optical character recognition (OCR), etc.) may be employed to extract name and address information from the documents, and compare the extracted information to corresponding information stored in public data sources and/or private data sources (e.g., network sites, databases, information extracted from the official identification used for proof of identity, etc.) to verify the mailing or residential address of the user. For example, the name information may be used to retrieve address information from the public data sources and/or private data sources. When the extracted address information matches or corresponds to the address information of the public data sources and/or private data sources, the user is considered to be verified based on proof of address. The extracted address information of any quantity of documents may match or correspond to address information of any quantity (e.g., one or more, etc.) of data sources to indicate a successful proof of address verification.

When the user does not correspond to the identification as determined at operations 715 or 725, the documents are not verified as determined at operation 740, or the proof of address is not verified as determined at operation 750, the verification fails and the user is determined not to be verified for the requested non-fungible token (NFT) at operation 760. Publish module 116 may perform various actions in response to this determination including denying publication (or minting) of the requested non-fungible token (NFT), and/or providing a notification or error message indicating failure of the verification as described above.

When the user corresponds to the identification as determined at operations 725 and 730 (without requiring further verification of the user), or the proof of address is successfully verified as determined at operation 750 (with further verification for the user), the user is determined to be verified for the requested non-fungible token (NFT) at operation 755. Verification module 120 produces verification information for the user (e.g., unique verification identifier, human readable blockchain based identifier (e.g., blockchain or non-fungible token (NFT) domain name, etc.), etc.), and publish module 116 may proceed to publish (or mint) and post the requested non-fungible token (NFT) as described above.

Further, verification module 120 may utilize various other user biometrics (e.g., fingerprints, iris patterns, etc.) and compare them to a government or other official identification in substantially the same manner described above for proof of identity. Verification module 120 may direct image capture device 235 to capture images of one or more other user biometrics (e.g., iris pattern, fingerprint, etc.). Alternatively, the verification module may direct a fingerprint scanner and/or eye scanner coupled to a client system to capture images of user fingerprints and/or iris patterns.

Moreover, verification module 120 may obtain image information of one or more biometrics for the identification. For example, the verification module may direct image capture device 235 to capture an image of the identification, where the identification includes images of the one or more biometrics (e.g., fingerprints, iris patterns, etc.). In addition, the images of the one or more biometrics (e.g., fingerprints, iris patterns, etc.) may be obtained from a memory device of the identification.

The images of the user biometrics may be compared to the images of biometrics for the identification based on image analysis techniques substantially similar to those described above. When one or more of the biometrics of the user are sufficiently similar to one or more corresponding biometrics of the identification, the user is verified for the requested non-fungible token (NFT) in substantially the same manner described above.

Further, the machine learning model described above may be trained using image information for different persons (e.g., images of person biometrics (e.g., fingerprints, iris patterns, etc.) and images of biometrics for identifications) to be recognized as input and known corresponding classifications (e.g., correspondence or non-correspondence) as output, where the neural network attempts to produce the provided output (or correspondence or non-correspondence classification). In an embodiment, the different combinations of images of person biometrics and images of biometrics for identifications may be used for the training set as input, while the corresponding known classifications (correspondence or non-correspondence) may be used for the training set as known output. In an embodiment, feature vectors may be extracted from the images and used for the training set as input, while the corresponding known classifications may be used for the training set as known output. A feature vector may include any suitable features (e.g., person features/dimensions, pixel features, etc.).

The output layer neurons provide a classification that indicates a presence of a correspondence or non-correspondence when an image of a person biometric and an image of a biometric for an identification are within input data as described above. Further, output layer neurons may be associated with the different classes, and indicate a probability for the input data being within a corresponding class (e.g., probabilities of a correspondence and a non-correspondence, etc.). The class associated with the highest probability is preferably selected as the class or result for the input data. The image of a user biometric (e.g., fingerprint, iris pattern, etc.) and the corresponding image for the identification are provided to the neural network, where the neural network indicates whether the user biometric corresponds to the identification. For example, a resulting classification of correspondence indicates the user biometric corresponds to the biometric for the identification which verifies the user. A resulting classification of non-correspondence indicates the user biometric does not correspond to the biometric for the identification, where the user remains unverified. The user may be determined to correspond to the identification to verify the user for the requested non-fungible token (NFT) when any quantity of biometrics (e.g., one or more biometrics, etc.) are determined by the neural network to correspond.

Moreover, the additional verification may include any Know Your Customer (KYC) or other types of verification. For example, the additional verification may include risk evaluation and/or user monitoring as described above. The user may submit one or more documents (or images of the one or more documents), and verification module 120 may analyze user activity or transactions via any conventional or other techniques (e.g., natural language processing, optical character recognition (OCR), machine learning, etc.) to identify patterns of unusual activity. In addition, verification module 120 may analyze user online activity to identify patterns of unusual activity. The analysis may determine a risk level that indicates a frequency of the monitoring. Identification of unusual activity or high risk may prevent verification of the user for publication (or minting) of the requested non-fungible token (NFT).

Figure 8:
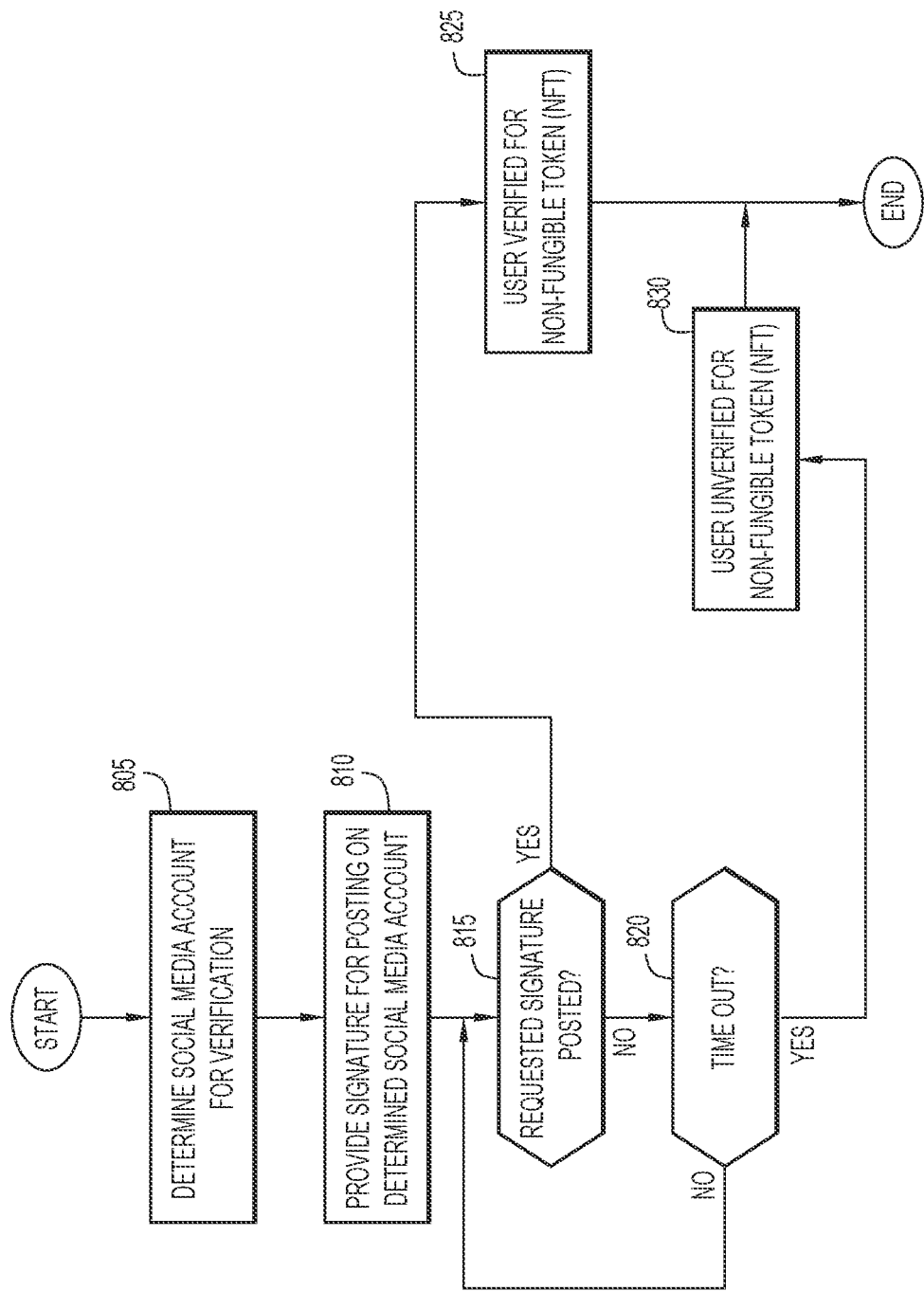
FIG. 8 is a flowchart of a manner of verifying a user publishing (or minting) a non-fungible token (NFT) on a blockchain based on posting information to a social media or other account of the user according to an embodiment of the present invention.

A manner of verifying a user for publishing (or minting) a non-fungible token (NFT) on a blockchain based on posting information to a social media or other account (e.g., via verification module 120 and server system 110 and/or client system 114) according to an embodiment of the present invention is illustrated in FIG. 8. Initially, verification module 120 of server system 110 determines a social media or other account (e.g., social media account, wallet account, domain name account, etc.) to use for verification of the user at operation 805. For example, the verification module may select an account from a pre-defined list and/or prompt the user for an account for the verification.

Further, verification module 120 may determine a set of social media or other accounts based on a search of network sites for a user name or other information received from the user on a user interface of client system 114. The search may retrieve user names or handles for the accounts. A social media or other account may be selected from the set of accounts based on a time period a social media or other account of the user has been active (e.g., the oldest active account, etc.), where older active social media or other accounts indicate greater trust of the identity of the user. Moreover, a social media or other account may be selected from the set of accounts based on an amount of followers, connections, or other linked accounts (e.g., greatest amount of followers, connections, or other linked accounts, etc.), where a greater number of followers, connections, or other linked accounts indicates greater trust of the identity of the user. In addition, a social media or other account may be selected from the set of accounts based on posts or other activity (e.g., greatest amount of posts or activity, etc.), where a greater number of posts or activity indicates greater trust of the identity of the user.

Once the social media account is selected, verification module 120 provides information to the user for posting to the selected social media or other account of the user at operation 810. By way of example, the information preferably includes a signature or code including any quantity of alphanumeric or other characters, symbols, and/or numerals. However, the information may include any desired information (e.g., a message, a signature or code, etc.). The information may be generated and provided to the user in any desired fashion. For example, the signature may be randomly generated, based on hashing or encryption, incremental numbers, etc. The information may be provided to the user on the user interface of client system 114, or sent to the user in an electronic message (e.g., email, text message, etc.).

Verification module 120 may provide a link on the user interface of client system 114 (e.g., FIG. 11) to enable the user to log in or access the selected account and post the signature. For example, the link may direct the user to a general login of the social media or other network service, where the user needs to enter the user name and password for the selected account. Alternatively, the link may direct the user to a specific login for the selected account (based on a provided user name), where the user needs to enter the password. The post may further include an identifier pertaining to the publishing (or minting) of the non-fungible token (NFT) to indicate the post as the verification. The login or access and detection of the posting of the signature may be accomplished via any conventional or other mechanisms (e.g., Open Authorization (OAuth) protocol, etc.). For example, the user may provide authorization for the social media or other network site to provide certain information pertaining to the selected account to the verification module. In response to the authorization, the verification module may request a token from an authorization server based on proof of identity. The token is used by verification module 120 to access the information of the selected account from the social media or other network site in substantially the same manner described above to detect a successful login or access to the selected account and posting of the signature. This enables the verification module to access the social media or other account of the user without receiving sensitive information (e.g., user name, passwords, etc.).

Alternatively, verification module 120 may access an account of the social media or other network site that is linked to the selected account for the user in order to view postings of the user account. In this case, the verification module may further provide an indicator of the linked account to be included in the posting of the signature. The user may log in or access the selected account for the posting in any fashion (e.g., another session, window, or tab of the interface module 122 (or browser), etc.).

Verification module 120 monitors the social media or other account of the user for the post at operation 815. The verification module may detect the identifier of a post as corresponding to the verification. In this case, the verification module compares the posted signature to the signature provided to the user. When the posted signature matches the signature provided to the user, the verification is successful.

Verification module 120 monitors the selected account until a successful verification of a posted signature is detected or a time out has occurred (e.g., a predetermined time interval has expired) as determined at operations 815 and 820. The time out may be a predetermined amount of time suitable to enable the user to the post the signature, and preferably in a range from one through five minutes. However, any time period may be used as the time out interval.

When the time out occurs (e.g., the predetermined time interval expires, etc.) without detecting a successful verification of a posted signature as determined at operation 820, the user verification fails. For example, a correct signature may not have been posted prior to expiration of the time interval for the time out. Accordingly, the user is determined not to be verified for the requested non-fungible token (NFT) at operation 830. Publish module 116 may perform various actions in response to this determination including denying publication (or minting) of the requested non-fungible token (NFT), and/or providing a notification or error message indicating failure of the verification as described above.

When the verification module detects successful verification of a posted signature prior to occurrence of the timeout (e.g., expiration of the predetermined time interval, etc.) as determined at operation 815, the user is determined to be verified for the requested non-fungible token (NFT) at operation 825. Verification module 120 produces verification information for the user (e.g., unique verification identifier, human readable blockchain based identifier (e.g., blockchain or non-fungible token (NFT) domain name, etc.), etc.), and publish module 116 may proceed to publish (or mint) and post the requested non-fungible token (NFT) as described above.

Figure 9:
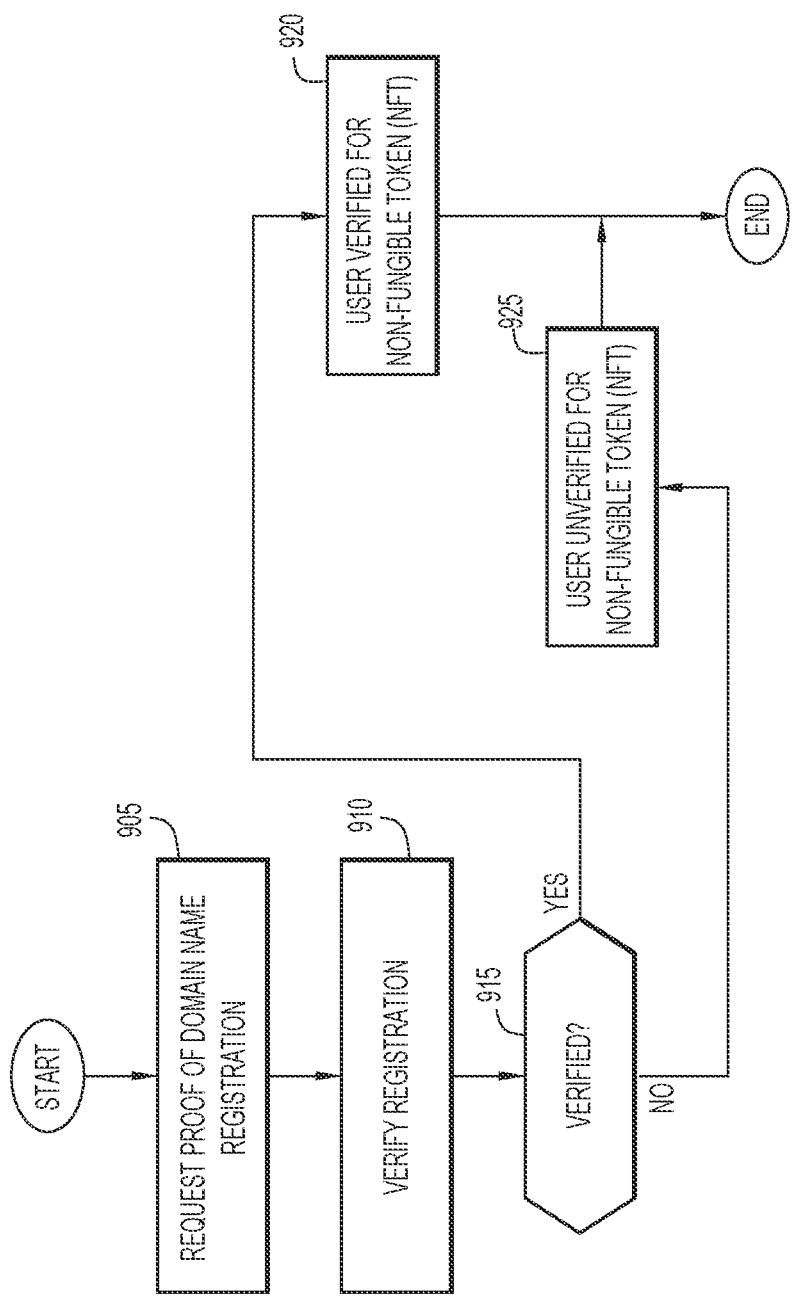
FIG. 9 is a flowchart of a manner of verifying a user publishing (or minting) a non-fungible token (NFT) on a blockchain based on proof of registration of a domain name of the user for a domain based system according to an embodiment of the present invention.

A manner of verifying a user for publishing (or minting) a non-fungible token (NFT) on a blockchain based on proof of registration of a domain name of a domain based system (e.g., via verification module 120 and server system 110 and/or client system 114) according to an embodiment of the present invention is illustrated in FIG. 9. Initially, a user may have a registered domain name of a domain based system. In this case, the user may indicate the domain name on a user interface of client system 114, and obtain proof of the registration. The proof of the registration may be in the form of a file bound to the user (e.g., .txt, html, etc.) that is obtained from a domain name registration provider (e.g., by accessing a corresponding account of the user). The file contains specific content pertaining to the registration.

Alternatively, the proof of the registration may be in the form of a Domain Name System (DNS) or other record that may be added or modified by the user on the system hosting the domain. For example, Domain Name System (DNS) creates a set of one or more records when a domain name is registered. By way example, the records may include records of one or more record types including an address (or A) record, a hostname pointing (or CNAME alias) record, a mail (or MX) record, a name server record, a private name server record, a text (or TXT/SPF) record, and a service (or SRV) record. The user may insert information into an existing record, or add a new record with the information (e.g., by accessing a corresponding account of the user).

Verification module 120 requests proof of the registration from the user at operation 905. The user attempts to obtain the file and upload the file to the system hosting the domain (e.g., by logging in or accessing the corresponding user account (e.g. via a user name and password, etc.), etc.). The file is preferably uploaded to a root or other directory of the web site of the domain.

In the case of a Domain Name System (DNS) or other record, verification module 120 may provide a message or setting to the user for insertion into an existing record (e.g., text or other record) or a new record (e.g., text or other record) to be added by the user. The message or setting may include any quantity of alphanumeric or other characters, symbols, and/or numerals. The message or setting may be provided to the user in any desired fashion. For example, the message or setting may be provided to the user on the user interface of client system 114, or sent to the user in an electronic message (e.g., email, text message, etc.). The user attempts to insert the message or setting into an existing record or add a new record with the message or setting (e.g., by logging in or accessing the corresponding user account (e.g., via a user name and password, etc.), etc.).

Verification module 120 verifies the file or record at operation 910. For example, the verification module may retrieve corresponding file or record information based on the domain name entered by the user on the user interface of client system 114 (e.g., Internet Protocol (IP) address of a server hosting the domain name, web site location, record information, etc.). The retrieved information may be included in file or record reference information to verify the file or record. The verification module may check and compare the presence, content, and/or attributes of the file (e.g., filename, content relative to another version of the file, location, timestamp (e.g., to ensure a recent file), etc.) to file reference information to verify the file. The file reference information includes valid information for the file (e.g., proper filename, content of a valid version, appropriate location, time period or age for the file (e.g., minutes, hours, days, etc.), etc.). Further, the verification module may check and compare the presence, content, and/or attributes of the record (e.g., record type, message or setting, timestamp (e.g., to ensure a recent record, etc.), etc.) to record reference information to verify the record. The record reference information includes valid information for the record (e.g., proper record type, proper message or setting, time period or age for record (e.g., minutes, hours, days, etc.), etc.).

When the verification fails as determined at operation 915, the user is determined not to be verified for the requested non-fungible token (NFT) at operation 925. For example, the file or record was not present, or the content and/or one or more attributes of the file or record did not comply with the associated reference information (e.g., incorrect filename or record type, incorrect message, the file or record is older than the time period or age, etc.). The failed verification indicates the user was not verified for the requested non-fungible token (NFT). Publish module 116 may perform various actions in response to this determination including denying publication (or minting) of the requested non-fungible token (NFT), and/or providing a notification or error message indicating failure of the verification as described above.

When the verification is successful (e.g., the file or record was present and the content and/or one or more attributes complied with the associated reference information) as determined at operation 915, the user is determined to be verified for the requested non-fungible token (NFT) at operation 920. Verification module 120 produces verification information for the user (e.g., unique verification identifier, human readable blockchain based identifier (e.g., blockchain or non-fungible token (NFT) domain name, etc.), etc.), and publish module 116 may proceed to publish (or mint) and post the requested non-fungible token (NFT) as described above.

In addition, verification module 120 may provide a number of attempts and/or a predetermined time interval for producing the proof of registration. When the proof of registration is not provided within the number of attempts and/or the predetermined time interval, verification of the user fails as described above. The number of attempts may be any desired amount, preferably one through five. Similarly, the predetermined time interval may be any time interval, preferably in the range of one through five minutes.

Figure 10:
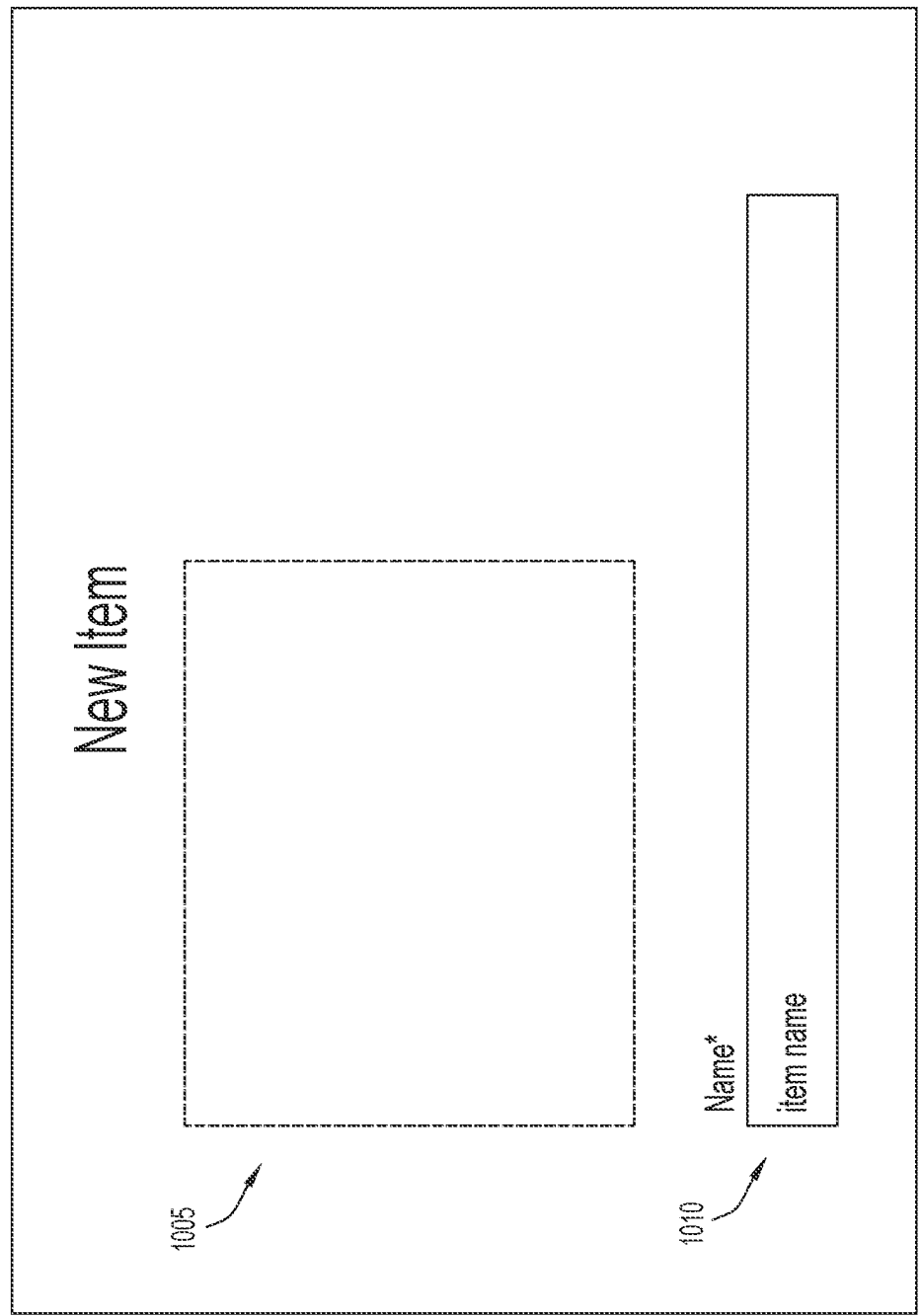
FIG. 10 is a schematic illustration of an example graphical user interface for publishing (or minting) a non-fungible token (NFT) according to an embodiment of the present invention.
Figure 11:
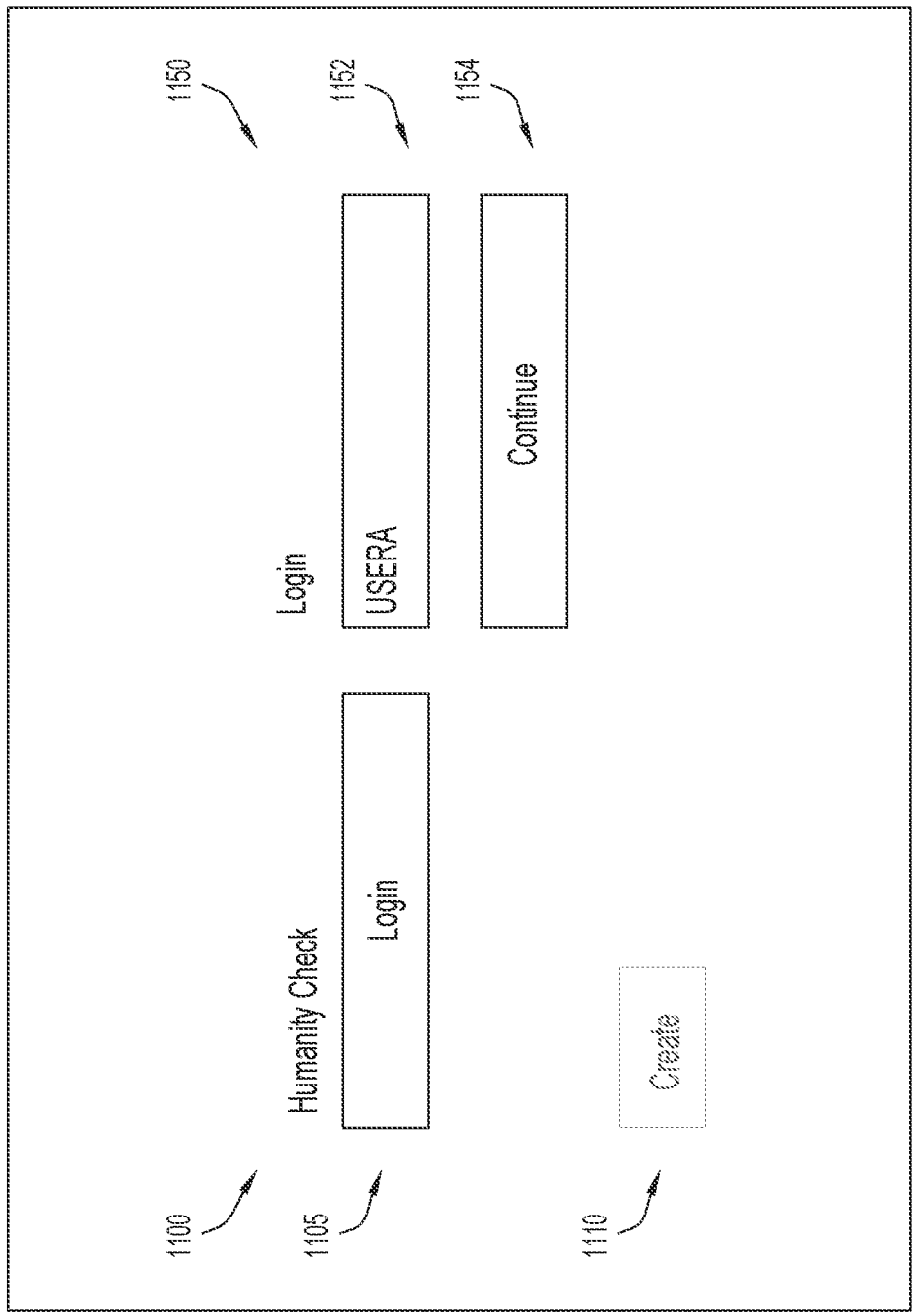
FIG. 11 is a schematic illustration of an example graphical user interface providing verification of a user publishing (or minting) a non-fungible token (NFT) according to an embodiment of the present invention.
Figure 12:
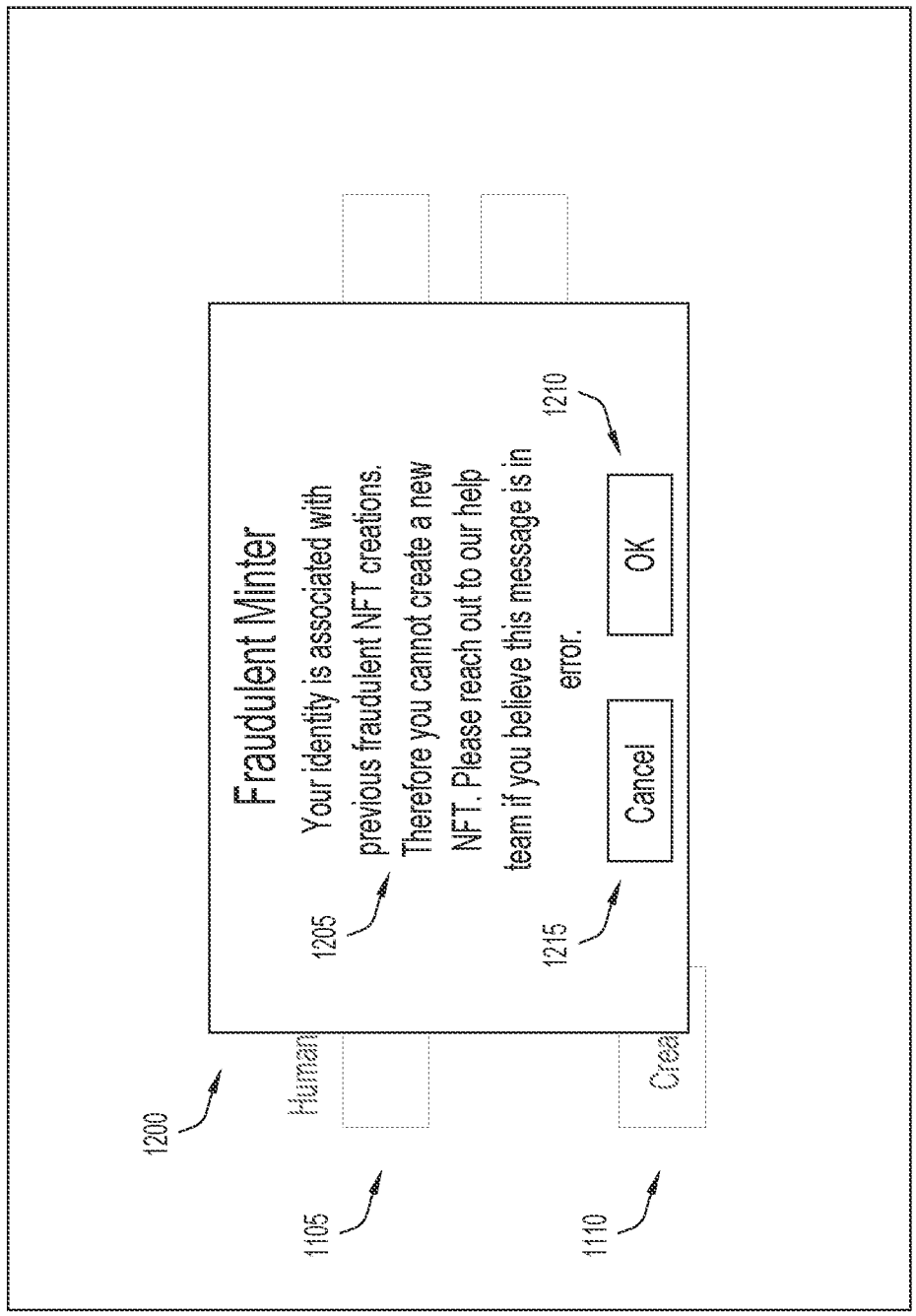
FIG. 12 is a schematic illustration of an example graphical user interface indicating results of verification of a user with respect to publishing (or minting) a fraudulent non-fungible token (NFT) according to an embodiment of the present invention.

An example scenario for publishing (or minting) a non-fungible token (NFT) on a blockchain according to an embodiment of the present invention is illustrated in FIGS. 10-12. Initially, a user creates artwork or other item and desires to convert the artwork to a non-fungible token (NFT). The user performs a minting process to list the non-fungible token (NFT) on a network site to indicate availability and enable transference of the non-fungible token (NFT) in substantially the same manner described above.

By way of example, user interface 1000 (FIG. 10) may be displayed on a client system 114 to initiate publishing (or minting) of the non-fungible token (NFT). User interface 1000 includes a presentation area 1005 disposed toward an upper portion of the user interface and a name field 1010 disposed below the presentation area. The presentation area may serve as, or include, an actuator that enables the user to upload a file containing the artwork. A visual representation of the content of the uploaded file (or artwork) may be presented in the presentation area (e.g., image with a same or a lower resolution or size, etc.). Name field 1010 receives a name for the non-fungible token (NFT) or artwork entered by a user.

Prior to initiating creation of the non-fungible token (NFT), the user performs an identity verification in substantially the same manner described above. Referring to FIG. 11, user interface 1100 may be presented as part of interface 1000, or as a separate interface after upload of the artwork file and entry of a name for the non-fungible token (NFT). User interface 1100 includes a login actuator 1105 and a create actuator 1110. Create actuator 1110 enables creation (publishing or minting) of the non-fungible token (NFT). The create actuator is preferably disabled (e.g., as shown by fading in FIG. 11) until a successful verification of the user.

Login actuator 1105 initiates presentation of a login interface or window 1150 to enable verification of the user based on a log in to a user account (e.g., a social media account, domain registration account, etc.) in substantially the same manner described above. Login interface 1150 includes a name field 1152 and a continue actuator 1154. The name field receives a user or other name, while continue actuator 1154 commences a login process to a corresponding user account. By way of example, name field 1152 receives a blockchain domain name for access to a domain registration account using a wallet verification process similar to the wallet verification process described above (e.g., for FIG. 6). The user may log in to the user account and enable sharing of verification information.

Once the user is verified, create actuator 1110 is enabled, thereby allowing the user to commence creation of the non-fungible token (NFT) and list the non-fungible token (NFT) on the network site. The create actuator is actuated by the user to create the non-fungible token (NFT), and a unique verification identifier, a human readable blockchain based identifier (e.g., blockchain or non-fungible token (NFT) domain name, etc.), and/or wallet address of the user is added to the smart contract to identify the publisher (or minter) in substantially the same manner described above.

A malicious user may copy the artwork, and create a corresponding fraudulent non-fungible token (NFT). The initial user creating the artwork identifies the corresponding fraudulent non-fungible token (NFT) presented from an account of the malicious user, and notifies the network site of the misappropriated content.

Although conventional approaches may remove the fraudulent non-fungible token (NFT) from the network site, the publisher identity remains unknown. Thus, there is no manner to ban or contact a malicious user, and the conventional approaches may enable users to repeatedly publish (or mint) fraudulent non-fungible tokens (NFTs).

Accordingly, present invention embodiments provide user verification to prevent users from repeatedly publishing (or minting) fraudulent non-fungible tokens (NFTs). For example, present invention embodiments verify the identity of the malicious user when the malicious user creates (publishes or mints) a non-fungible token (NFT) as described above. The resulting verification information (e.g., unique verification identifier, human readable blockchain based identifier (e.g., blockchain or non-fungible token (NFT) domain name, etc.), and/or wallet address) is inserted into the smart contract for the non-fungible token (NFT) and stored on a blockchain in substantially the same manner described above.

When the notice of a fraudulent non-fungible token (NFT) is received, the user publishing (or minting) the fraudulent non-fungible token (NFT) is identified based on the verification information of the modified smart contract corresponding to the fraudulent non-fungible token (NFT). In addition, the verification information of the user (e.g., unique verification identifier, human readable blockchain based identifier (e.g., blockchain or non-fungible token (NFT) domain name, etc.), wallet address, etc.) may be stored in a listing of users associated with fraudulent non-fungible tokens (NFTs).

The malicious user may attempt to publish (or mint) another fraudulent non-fungible token (NFT). Once the identity of the malicious user is verified, the verification information produced from verifying the malicious user is used to search the listing of users associated with fraudulent non-fungible tokens (NFTs) to determine a presence of the malicious user in the listing. The presence of the malicious user in the listing indicates that the malicious user is associated with (e.g., published or minted) a fraudulent non-fungible token (NFT) on the blockchain (e.g., has a history of publishing (or minting) fraudulent non-fungible tokens (NFTs) on the blockchain).

Since the malicious user has a history of publishing a fraudulent non-fungible token (NFT), a user interface or dialog box 1200 (FIG. 12) may be presented on user interface 1100 to indicate denial of the publication request. By way of example, user interface 1200 includes a message area 1205, a continue actuator 1210, and a cancel actuator 1215. Message area 1205 presents a message indicating that the malicious user is prevented from creating non-fungible tokens (NFTs). Continue actuator 1210 enables return to another page or screen of the network site, while cancel actuator 1215 enables cancelation of the current publishing transaction.

An embodiment of the present invention may utilize a previous Know Your Customer (KYC) verification to proceed with the publishing (or minting) of the non-fungible token (NFT) with reduced verification requirements. For example, an initial verification of a user may require proof of identity and proof of address. An indication of the verification (e.g., verification identifier and/or associated blockchain identifier, etc.) may be stored (e.g., in database system 118). However, once a user has been verified based on the stored indication, the verification requirements may be reduced for the previously verified user. By way of example, facial recognition, a password, a verification identifier and/or associated blockchain identifier, or other indicators of a prior verification may be used for a previously verified user, as opposed to more stringent Know Your Customer (KYC) requirements. A modified user interface may be provided based on the Know Your Customer (KYC) verification (e.g., a user interface without the capability of the log in to a user account, etc.). Accordingly, a different user experience may be provided for verified users to prioritize and streamline creation of the non-fungible token (NFT).

Present invention embodiments may provide various technical and other advantages. For example, present invention embodiments provide creation of non-fungible tokens (NFTs) or other assets with various enhanced security aspects. For example, the creation of the non-fungible token (NFT) with verification information on the blockchain enables malicious users to be quickly identified and prevented from creating other non-fungible tokens (NFTs). In addition, modification of the smart contract or code enables the blockchain to perform actions with respect to the malicious user (e.g., prevent creation of non-fungible tokens (NFTs), etc.), thereby improving processing. This provides secure creation and automatic preventative actions with respect to non-fungible tokens (NFTs).

Moreover, present invention embodiments provide immediate verification of a user in order provide enhanced security for non-fungible tokens (NFTs). The verification prevents creation of fraudulent non-fungible tokens (NFTs) by malicious users that may cause unnecessary processing and network traffic. Further, present invention embodiments may rely on or use verification by the social media or other accounts of the user to verify the user (e.g., based on the user login, posting, etc.). This avoids significant amounts of processing, conserves processing and memory resources, and provides a rapid user verification. Moreover, present invention embodiments may rely on a prior verification of a user. In this case, creation of non-fungible tokens (NFTs) may proceed with a reduced verification process, thereby avoiding significant amounts of processing, conserving processing and memory resources, and providing rapid creation of non-fungible tokens.

In addition, the machine learning model for biometric verification described above may be continuously updated (or trained) based on feedback related to another verification (e.g., based on access to an account of the user as described above, etc.). For example, the neural network may indicate a user corresponds to a biometric for the identification (e.g., with a lower confidence or probability). However, the other verification may indicate a successful verification. Further, the neural network may indicate a user does not correspond to a biometric for the identification (e.g., with a lower confidence or probability), where the other verification may indicate a verification failure. In addition, the neural network may produce a result inconsistent with the other verification.

In these types of cases, the machine learning model may be updated (or trained) based on the other verification. By way of example, the image information for the user and for the identification may be used to update or train the machine learning model (e.g., update or train the machine learning model to increase the probability for and/or change a resulting classification, etc.). For example, the probability for a resulting classification (correspondence or non-correspondence) may be increased when the results of the neural network are consistent with the other verification. Further, the resulting classification (correspondence or non-correspondence) and/or corresponding probability may be changed when the results of the neural network are inconsistent with the other verification. Thus, the machine learning model may continuously evolve (or be trained) to compare biometrics of the user and for the identification as the comparisons are being performed.

It will be appreciated that the embodiments described above and illustrated in the drawings represent only a few of the many ways of implementing embodiments for controlling publishing of assets on a blockchain. In addition, characteristics or features of embodiments of the present invention may be combined in any fashion to provide additional embodiments of the present invention.

The environment of the present invention embodiments may include any number of computer or other processing systems (e.g., client or end-user systems, server systems, service provider systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, handheld devices, smartphones or other mobile devices, etc.), and may include any commercially available operating system and any combination of commercially available and custom software (e.g., communications software; server software; software of present invention embodiments (including publish module 116, verification module 120, interface module 122, etc.), etc.). These systems may include any types of monitors and input devices (e.g., keyboard, mouse, voice recognition, etc.) to enter and/or view information.

It is to be understood that the software of the present invention embodiments (e.g., publish module 116, verification module 120, interface module 122, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, server, and service provider systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., publish module 116, verification module 120, interface module 122, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with standalone systems or systems connected by a network or other communications medium. The computer useable or readable medium may include instructions executable by one or more processors to perform functions of present invention embodiments described herein.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., mappings of users to social media or other accounts, listing of users associated with fraudulent assets, etc.). The database system may be implemented by any number of any conventional or other databases, data stores or storage structures to store information. The database system may be included within or coupled to the server, client, and/or service provider systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., asset information, information to perform verification, user accounts or wallets, domain names, results of publishing (or minting), results of verification, identification of a fraudulent asset and/or malicious user, notifications and/or messages, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., results of publishing (or minting), results of verification, identification of fraudulent assets and/or malicious users, etc.).

The present invention embodiments are not limited to the specific tasks or algorithms described above, but may be utilized for verifying users for storing any type of assets on a blockchain.

The present invention embodiments may be utilized for any operation (e.g., publishing (or minting), etc.) for any asset (e.g., fungible token, non-fungible token (NFT), other crypto asset, etc.). Any information may be obtained from the user or other source for the non-fungible token (NFT) (e.g., a recipient or wallet address, a tokenURI for the non-fungible token, name for the non-fungible token, etc.). The verification information may include any quantity of any identifiers associated with a user (e.g., verification identifier, human readable blockchain based identifier (e.g., blockchain or non-fungible token (NFT) domain name, etc.), wallet address or other crypto identifier, etc.). The verification identifier may be generated in any fashion (e.g., a randomly generated identification number or data sequence, incremental numbers, etc.), and may include any quantity of any types of data elements arranged in any fashion (e.g., numbers, alphanumeric elements, symbols, etc.). The verification identifier (and other verification information) preferably changes for each new user. In other words, the verification identifier (and other verification information) preferably remains the same for the same user for each verification. This enables identification of a malicious user based on substantially the same verification information generated for verifications of the malicious user subsequent the verification of the malicious user for an initial fraudulent non-fungible token (NFT).

The smart contract or any other software or data may be modified in any manner to identify a user publishing (or minting) a corresponding non-fungible token (NFT). For example, new or modified software code may be produced for the non-fungible token (NFT) to include any verification information to identify a user. The modified software code may be in the form of a patch. The software code may include data (e.g., verification information, etc.) and/or code executable by one or more processors to perform various actions. For example, the smart contract may be modified to include verification information including the unique verification identifier, the human readable blockchain based identifier (e.g., blockchain or non-fungible token (NFT) domain name, etc.), the wallet address (or other unique crypto identifier) for the user, and/or any other information identifying the user. Further, the modified smart contract may include code executable by one or more processors to perform actions including, by way of example, identifying a malicious user based on a comparison of verification information, providing notifications concerning a fraudulent non-fungible token (NFT) and/or malicious user, preventing publishing (or minting) by a malicious user, and/or performing other actions, etc.

The non-fungible token (NFT) may be created and placed in a user wallet (e.g., without posting to a network site). Further, the non-fungible token (NFT) may be posted or placed on any network site to indicate availability for transference to another user. A notification may be received from any party indicating a non-fraudulent token (NFT) (e.g., party having rights to the corresponding item, etc.). The notification may be of any type and provided in any manner (e.g., electronic notification or message, text message, email message, etc.). The listing may include any registry, directory, or other structure of any format containing any information identifying users associated with fraudulent non-fungible tokens (NFTs) (e.g., verification identifier, human readable blockchain based identifier, wallet address, etc.). The listing may further contain any information identifying the fraudulent non-fungible tokens (NFTs) associated with the users (e.g., name, etc.). A user requesting publishing (or minting) may correspond to a user of the listing based on any criteria (e.g., full or partial match of verification information, etc.). The listing may be stored in any type of storage structure (e.g., database, blockchain, etc.).

The verification of the user may employ any Know Your Customer (KYC) or other types of verification processes. The verification may include any quantity of any types of verification (e.g., user identity, user address, user activity, user financial or credit status, etc.) to verify a user for publishing (or minting) a non-fungible token (NFT). The verification may access any public or private data sources to obtain or validate user information.

The verification of the user may be based on any quantity or type of accounts of the user (e.g., social media account, network site account, domain name registration account, service provider account, electronic wallet account, etc.). The verification may detect any type of operation within the account to verify a user (e.g., a login, post, sign, dummy or other transaction, retrieval of information, etc.).

The verification of the user may select one or more user accounts to use to verify a user in any fashion (e.g., number of linked accounts, frequency of activity, time interval an account is active, etc.), where any quantity of failed verifications (e.g. one or more failed verifications, etc.) may indicate an unverified user. The verification may detect a login or other access to any quantity of user accounts in any fashion (e.g., response from account, a transaction conducted within the account, etc.), where detection of access for any quantity of accounts (e.g. one or more accounts, etc.) may be used to verify the user. The verification may permit any number of access attempts to verify a user (e.g., in a range of one through five, etc.). In addition, the verification may provide any desired time interval for accessing an account (e.g., in a range of one through five minutes, etc.).

The verification of the user may detect any operation in an electronic wallet of the user to verify the user (e.g., sign a message or transaction, a dummy transaction, access to the wallet, etc.). The verification may provide any desired time interval for performing the operation in the wallet (e.g., in a range of one through five minutes, etc.).

The verification of the user may use any quantity of any biometrics to verify the user (e.g., face, fingerprints, iris patterns, etc.), where any quantity of biometrics (e.g., one or more biometrics, etc.) corresponding between the user and identification may verify the user. The identification may be any identification (e.g., license, passport, etc.) issued by an official entity or organization (e.g., government, state, country, etc.). The identification may display information (e.g., name, etc.) and images of biometrics, and/or may include a memory device containing this information. The biometrics of the user and for the identification may be compared using any conventional or other techniques (e.g., image analysis, machine learning, etc.).

Additional verification may be employed based on any conditions (e.g., a previous successful verification of the user, etc.). An indication of a successful verification may be based on any information (e.g., verification identifier and/or associated blockchain identifier, etc.), where presence of the information for a user (e.g., in a storage structure, etc.) indicates a prior verification. The additional verification may include any type of verification (e.g., proof of identity, proof of address, user risk level, user activity or monitoring, user financial or credit status, etc.). Any quantity of any types of documents from any organization may be used for the additional verification (e.g., a passport, a driving license, a utility bill (electricity, gas, etc.), telephone bill, a bank statement, a credit card statement, etc.). The address information for the documents may be compared to any quantity of any types of data sources (e.g., public, private, network sites, databases, identification presented by the user, etc.) for proof of identity and/or address. Any conventional or other techniques may be employed to extract information from the documents (e.g., natural language processing, optical character recognition (OCR), etc.). The extracted information of any quantity of documents may match or correspond in any fashion (e.g., full or partial match, etc.) to information of any quantity (e.g., one or more, etc.) of data sources to indicate a successful proof of address verification. Any reduced verification techniques may be employed for a previously verified user (e.g., facial recognition, a password, a verification identifier and/or associated blockchain identifier, etc.).

The verification of the user may provide any information to a user to post to any quantity of user accounts (e.g., signature, code, message, etc.), where detection of the posting on any quantity of accounts (e.g., one or more accounts, etc.) may be used to verify the user. The information may include any quantity of alphanumeric or other characters, symbols, and/or numerals. The posting may include any type of identifier to indicate the post corresponds to the verification (e.g., account identifier, etc.). The verification may provide any desired time interval for posting of the information (e.g., in a range of one through five minutes, etc.).

The verification of the user may detect any file or record corresponding to a registered domain name of the user at any location. The file or record may be of any type, and include any information corresponding to the registration. The verification may provide any information to a user to insert in any quantity of records (e.g., message, setting, etc.), where detection of the information in any quantity of records (e.g., one or more records, etc.) may be used to verify the user. The information may include any quantity of alphanumeric or other characters, symbols, and/or numerals. Alternatively, the presence of the file or any new records may be used to verify the user. The verification may permit any number of attempts to provide proof of registration to verify a user (e.g., in a range of one through five, etc.). In addition, the verification may provide any desired time interval for providing proof of registration (e.g., in a range of one through five minutes, etc.).

The non-fungible token (NFT) may be published (or minted) on any quantity of any types of systems (e.g., de-centralized, hybrid, etc.). The non-fungible token (NFT) may be stored on the blockchain in any fashion (e.g., one or more transactions, smart contract, etc.). The verification information may be stored on or off the blockchain in any storage structure (e.g., smart contract, blocks of a blockchain, blockchain storage, database, etc.).

Having described preferred embodiments of a new and improved system, method, and computer program product for controlling publishing of assets on a blockchain, it is believed that other modifications, variations and changes will be suggested to those skilled in the art in view of the teachings set forth herein. It is therefore to be understood that all such variations, modifications and changes are believed to fall within the scope of present invention embodiments as defined by the appended claims.

What is claimed is:

1. A method of controlling creation of a non-fungible token on a blockchain comprising:
    verifying, via at least one processor, a user requesting creation of the non-fungible token on the blockchain;
    generating, via the at least one processor, verification information that identifies the user and indicates successful verification of the user;
    creating, via the at least one processor, the non-fungible token on the blockchain and modifying code of a smart contract of the blockchain by the at least one processor to include the verification information and to control publishing on the blockchain;
    receiving, via the at least one processor, notification that the non-fungible token is a fraudulent non-fungible token indicating improper ownership;
    identifying, via the at least one processor, the user corresponding to the fraudulent non-fungible token based on the verification information of the modified smart contract and storing an indication associating the verification information of the user with the fraudulent non-fungible token;
    receiving, via the at least one processor, a second request from a second user for creating a second non-fungible token on the blockchain;
    generating, via the at least one processor, verification information that identifies the second user and indicates successful verification of the second user; and
    controlling creation of the second non-fungible token on the blockchain, via the at least one processor, by executing the modified smart contract, wherein the modified smart contract performs actions including:
        comparing verification information of the second user to the verification information associated with the fraudulent non-fungible token based on the indication; and
        preventing creation of the second non-fungible token on the blockchain for the second user based on the verification information of the second user corresponding to the verification information associated with the fraudulent non-fungible token.

2. The method of claim 1, wherein the verification information includes a non-fungible token domain name of the user.

3. The method of claim 1, wherein verifying the user requesting creation of the non-fungible token comprises:
    selecting an account of the user for a network site and detecting a login to the selected account by the user or a post to the selected account with information provided to the user, wherein detecting includes requesting a token from an authorization server and accessing information of the selected account from the network site using the token.

4. The method of claim 1, wherein verifying the user requesting creation of the non-fungible token comprises:
    verifying the user based on a comparison of an image of the user captured by an image capture device to image information of an official identification.

5. The method of claim 1, wherein verifying the user requesting creation of the non-fungible token comprises:
    verifying the user based on one or more from a group of user activity and a comparison of information extracted from one or more user-provided items to corresponding information for the user retrieved from one or more data sources.

6. A system for controlling creation of a non-fungible token on a blockchain comprising:
    one or more memories; and
    at least one processor coupled to the one or more memories, the at least one processor configured to:
        verify a user requesting creation of the non-fungible token on the blockchain;
        generate verification information that identifies the user and indicates successful verification of the user;
        create the non-fungible token on the blockchain and modify code of a smart contract of the blockchain to include the verification information and to control publishing on the blockchain;
        receive notification that the non-fungible token is a fraudulent non-fungible token indicating improper ownership;
        identify the user corresponding to the fraudulent non-fungible token based on the verification information of the modified smart contract and store an indication associating the verification information of the user with the fraudulent non-fungible token;
        receive a second request from a second user for creating a second non-fungible token on the blockchain;
        generate verification information that identifies the second user and indicates successful verification of the second user; and
        control creation of the second non-fungible token on the blockchain by executing the modified smart contract, wherein the modified smart contract performs actions including:
            comparing verification information of the second user to the verification information associated with the fraudulent non-fungible token based on the indication; and
            preventing creation of the second non-fungible token on the blockchain for the second user based on the verification information of the second user corresponding to the verification information associated with the fraudulent non-fungible token.

7. The system of claim 6, wherein the verification information includes a non-fungible token domain name of the user.

8. The system of claim 6, wherein verifying the user requesting creation of the non-fungible token comprises:
    selecting an account of the user for a network site and detecting a login to the selected account by the user or a post to the selected account with information provided to the user, wherein detecting includes requesting a token from an authorization server and accessing information of the selected account from the network site using the token.

9. The system of claim 6, wherein verifying the user requesting creation of the non-fungible token comprises:
    verifying the user based on a comparison of an image of the user captured by an image capture device to image information of an official identification.

10. The system of claim 6, wherein verifying the user requesting creation of the non-fungible token comprises:
    verifying the user based on one or more from a group of user activity and a comparison of information extracted from one or more user-provided items to corresponding information for the user retrieved from one or more data sources.

11. A computer program product for controlling creation of a non-fungible token on a blockchain, the computer program product comprising one or more computer readable media having instructions stored thereon, the instructions executable by at least one processor to cause the at least one processor to:

verify a user requesting creation of the non-fungible token on the blockchain;

generate verification information that identifies the user and indicates successful verification of the user;

create the non-fungible token on the blockchain and modify code of a smart contract of the blockchain to include the verification information and to control publishing on the blockchain;

receive notification that the non-fungible token is a fraudulent non-fungible token indicating improper ownership;

identify the user corresponding to the fraudulent non-fungible token based on the verification information of the modified smart contract and store an indication associating the verification information of the user with the fraudulent non-fungible token;

receive a second request from a second user for creating a second non-fungible token on the blockchain;

generate verification information that identifies the second user and indicates successful verification of the second user; and control creation of the second non-fungible token on the blockchain by executing the modified smart contract, wherein the modified smart contract performs actions including:

comparing verification information of the second user to the verification information associated with the fraudulent non-fungible token based on the indication; and preventing creation of the second non-fungible token on the blockchain for the second user based on the verification information of the second user corresponding to the verification information associated with the fraudulent non-fungible token.

12. The computer program product of claim 11, wherein the verification information includes a non-fungible token domain name of the user.

13. The computer program product of claim 11, wherein verifying the user requesting creation of the non-fungible token comprises:

selecting an account of the user for a network site and detecting a login to the selected account by the user or a post to the selected account with information provided to the user, wherein detecting includes requesting a token from an authorization server and accessing information of the selected account from the network site using the token.

14. The computer program product of claim 11, wherein verifying the user requesting creation of the non-fungible token comprises:

verifying the user based on a comparison of an image of the user captured by an image capture device to image information of an official identification.

15. The computer program product of claim 11, wherein verifying the user requesting creation of the non-fungible token comprises:

verifying the user based on one or more from a group of user activity and a comparison of information extracted from one or more user-provided items to corresponding information for the user retrieved from one or more data sources.

16. The method of claim 1, wherein verifying the user requesting creation of the non-fungible token comprises one or more from a group of:

detecting performance of an operation by the user in an electronic wallet of the user; and verifying proof of registration of a registered domain name of the user, wherein the proof of registration includes one of a file and a record based on the registration and is generated for the user from an account of the user for a network site.

17. The method of claim 4, wherein verifying the user requesting creation of the non-fungible token further comprises:

verifying the user, via a neural network, based on the image of the user and the image information of the official identification; and continuously updating the neural network as users are verified by training based on comparisons of results of the neural network and results of another type of user verification.

18. The system of claim 6, wherein verifying the user requesting creation of the non-fungible token comprises one or more from a group of:

detecting performance of an operation by the user in an electronic wallet of the user; and verifying proof of registration of a registered domain name of the user, wherein the proof of registration includes one of a file and a record based on the registration and is generated for the user from an account of the user for a network site.

19. The system of claim 9, wherein verifying the user requesting creation of the non-fungible token further comprises:

verifying the user, via a neural network, based on the image of the user and the image information of the official identification; and continuously updating the neural network as users are verified by training based on comparisons of results of the neural network and results of another type of user verification.

20. The computer program product of claim 11, wherein verifying the user requesting creation of the non-fungible token comprises one or more from a group of:

detecting performance of an operation by the user in an electronic wallet of the user; and verifying proof of registration of a registered domain name of the user, wherein the proof of registration includes one of a file and a record based on the registration and is generated for the user from an account of the user for a network site.

21. The computer program product of claim 14, wherein verifying the user requesting creation of the non-fungible token further comprises:

verifying the user, via a neural network, based on the image of the user and the image information of the official identification; and continuously updating the neural network as users are verified by training based on comparisons of results of the neural network and results of another type of user verification.

* * * * *